US008676964B2

(12) United States Patent
Gopalan et al.

(10) Patent No.: US 8,676,964 B2
(45) Date of Patent: *Mar. 18, 2014

(54) DETECTING OUTLIERS IN NETWORK TRAFFIC TIME SERIES

(75) Inventors: Prem K. Gopalan, Cambridge, MA (US); Bryan Thomas Elverson, Arlington, MA (US)

(73) Assignee: Riverbed Technology, Inc., San Francisco, CA (US)

( * ) Notice: Subject to any disclaimer, the term of this patent is extended or adjusted under 35 U.S.C. 154(b) by 322 days.

This patent is subject to a terminal disclaimer.

(21) Appl. No.: 12/266,105

(22) Filed: Nov. 6, 2008

(65) Prior Publication Data
US 2010/0030544 A1 Feb. 4, 2010

Related U.S. Application Data

(60) Provisional application No. 61/085,152, filed on Jul. 31, 2008.

(51) Int. Cl.
*G06F 15/16* (2006.01)
*G06F 15/173* (2006.01)
*G01R 31/08* (2006.01)

(52) U.S. Cl.
USPC ........ 709/224; 709/201; 709/223; 370/230.1; 370/235

(58) Field of Classification Search
USPC ................ 709/201, 223, 224; 370/230.1, 235
See application file for complete search history.

(56) References Cited

U.S. PATENT DOCUMENTS

| 5,555,444 | A  | * | 9/1996  | Diekelman et al. | 455/12.1 |
| 6,519,705 | B1 | * | 2/2003  | Leung | 713/300 |
| 6,597,777 | B1 | * | 7/2003  | Ho | 379/133 |
| 8,234,705 | B1 | * | 7/2012  | Roskind et al. | 726/22 |
| 2003/0208523 | A1 | * | 11/2003 | Gopalan et al. | 709/201 |
| 2007/0206639 | A1 | * | 9/2007  | Zhao et al. | 370/477 |
| 2009/0126023 | A1 | * | 5/2009  | Yun et al. | 726/25 |
| 2010/0284283 | A1 | * | 11/2010 | Golic et al. | 370/242 |

* cited by examiner

*Primary Examiner* — Ranodhi Serrao
*Assistant Examiner* — Farrukh Hussain
(74) *Attorney, Agent, or Firm* — Park, Vaughan, Fleming & Dowler LLP

(57) ABSTRACT

According to an aspect of the invention, a system and method is configured to detect time series outliers in network traffic.

19 Claims, 20 Drawing Sheets

Impacted Infrastructure and Applications — 244, 246

- ⇩ Traffic on interface 160.0.0.77:ifdesc/160_0_0_77 has decreased by 92% from connection/s to 1.33 connections/s. — 242a
- ⇧ Traffic on interface 160.0.0.66:6 has increased by 20.00% from 10,000 milliseconds to 12,000 milliseconds. — 242b
- ⇩ Traffic on tcp/465 (smtps) with app IMESH-HTTP has decreased by 100% from 2.67 connections/s to 0 connections/s. — 242c
- ⇧ Traffic on tcp/465 (smtps) with app GNUTELLA-HTTP has increased by 20.00% from 10,000 milliseconds to 12,000 milliseconds. — 242d
- ⇩ Traffic on server 2.20.8.1 has decreased by 100% from 2.67 connections/s to 0 connections/s. — 242e
- ⇧ Traffic on server 2.20.6.1 has increased by 20.00% from 10,000 milliseconds to 12,000 milliseconds. — 242f

240

Impact Details

Change in Connections/s by Network Interface [Options▼] — 252

Top Network Interface by Impact Score (chart, Impact Score 0–10)

Ordered by: [Impact Score]

Network Interface 1 - 10 of 12 — 254, 256, 258, 260 [Options▼]

| Interface | Avg Conns/s | 22 minutes 47 seconds ago Avg Conns/s | Impact Score |
|---|---|---|---|
| 160.0.077:ifdesc/160_0_0_77 | 1 | 16 | 3.3 |
| 160.0.077:ifdesc/160_0_0_77 | 1 | 16 | 3.3 |
| 160.0.0.66:10 | 0 | 3 | <1 |
| 160.0.0.66:9 | 0 | 3 | <1 |
| 160.0.0.66:2 | 0 | 3 | <1 |
| 160.0.0.66:3 | 0 | 1 | <1 |
| 160.0.0.66:1 | 0 | 1 | <1 |
| 160.0.0.66:7 | 0 | 1 | <1 |
| 160.0.0.66:4 | | <1 | <1 |

|◄ ◄ page 1 of 12 ► ►| go to page [1]

DETECTING OUTLIERS IN NETWORK TRAFFIC TIME SERIES

CLAIM OF PRIORITY

This application claims priority under 35 U.S.C. §119(e) to provisional U.S. Patent Application 61/085,152, filed on Jul. 31, 2008, the entire contents of which is hereby incorporated by reference.

BACKGROUND

This invention relates to systems, methods, and techniques to detect anomalies in network traffic.

Networks allow computers (hosts) to communicate with each other whether over a public network, e.g., the Internet, or over private networks. For instance, many enterprises have internal networks (intranets) to handle communication throughout the enterprise. Hosts on these networks can generally have access to both public and private networks.

Managing these public and private networks is becoming increasingly costly, and the business cost of dealing with network problems is increasingly high. Managing an enterprise network involves a number of inter-related activities including establishing a topology, establishing policies for the network and monitoring network performance. Another task for managing a network is detecting and dealing with changes in the level of network traffic.

SUMMARY

According to an aspect of the invention, a system and method is configured to detect time series outliers in network traffic.

According to an aspect of the invention, a system and method is configured to generate impact scores based on observed network traffic.

According to an aspect of the invention, a system and method is configured to generate a user interface to display information about time series outliers in network traffic.

According some aspects of the invention, a computer program product resides on a computer readable medium for intrusion detection. The computer program product includes instructions for causing a processor to generate a forecast of network traffic using a model that includes at least a first and a second seasonality, the forecast being based on previously observed network traffic at first and second time periods associated with the first and a second seasonality. The computer program product also includes instructions for causing the processor to generate a prediction interval that extends above and below the forecast of the network traffic, the prediction interval being based on previously observed deviations from predicted network traffic. The computer program product also includes instructions for causing the processor to compare observed network traffic to the prediction interval. The computer program product also includes instructions for causing the processor to identify an outlier if the observed network traffic is outside of the prediction interval.

Embodiments can include one or more of the following.

The computer program product also includes instructions for causing the processor to generate the forecast using a Holt-Winters model having daily and weekly seasonality.

The computer program product also includes instructions for causing the processor to initialize the model used to generate the forecast based on about two weeks of network traffic data and initialize errors used to generate the prediction interval using about one week of network traffic data.

The first seasonality can be a weekly seasonality and the first time period can be a time period one week prior to the time of the observed network traffic. The second seasonality can be a daily seasonality and the second time period can be a time period one day prior to the time of the observed network traffic.

The computer program product also includes instructions for causing the processor to maintain a count of detected outliers and identify an anomaly in network traffic if the count of detected outliers during a time period exceeds an anomaly threshold.

The computer program product also includes instructions for causing the processor to merge multiple detected anomalies during a time period to generate an event.

The computer program product also includes instructions for causing the processor to provide information about the network traffic at the time of the event to a user.

The instructions for causing the processor to generate the prediction interval can include instructions for causing the processor to define a distribution identifying the variance of errors and use the variance to determine the expected variance about a the forecast of network traffic.

The forecast and the prediction interval can be based on network data associated with a sliding window of prior network data.

In some additional aspects, a computer program product resides on a computer readable medium for intrusion detection. The computer program product includes instructions for causing a processor to maintain information related to raw errors in network traffic. The computer program product also includes instructions for causing the processor to determine errors associated with a time period centered about a week prior to a particular time. The computer program product also includes instructions for causing the processor to generate a week-based prediction interval based on the determined errors, the prediction interval providing an interval about a Holt-Winters based forecast for the particular time. The computer program product also includes instructions for causing the processor to compare the network traffic for the particular time to the week-based prediction interval.

Embodiments can include one or more of the following.

The computer program product also includes instructions for causing the processor to determine errors associated with a time period centered about a day prior to a particular time, generate a day-based prediction interval based on the determined errors, the second prediction interval providing an interval about a Holt-Winters based forecast for the particular time, and compare the network traffic for the particular time to the day-based prediction interval.

The computer program product also includes instructions for causing the processor to determine if the network traffic is outside of both the week-based and day-based prediction intervals based on the comparison of the network traffic for the particular time to the week-based and day-based prediction intervals and identify an outlier if the network traffic is outside of both the week-based and day-based prediction intervals.

In some additional aspects, an anomaly detection system can include a computing device configured to generate a forecast of network traffic using a model that includes at least a first and a second seasonality, the forecast being based on previously observed network traffic at first and second time periods associated with the first and a second seasonality. The computing device can be further configured to generate a prediction interval that extends above and below the forecast of the network traffic, the prediction interval being based on previously observed deviations from predicted network traffic. The computing device can be further configured to compare observed network traffic to the prediction interval. The computing device can be further configured to identify an outlier if the observed network traffic is outside of the prediction interval.

Embodiments can include one or more of the following.

The computing device can be further configured to generate the forecast using a Holt-Winters model having daily and weekly seasonality.

The computing device can be further configured to initialize the model used to generate the forecast based on about two weeks of network traffic data and initialize errors used to generate the prediction interval using about one week of network traffic data.

The first seasonality can be a weekly seasonality and the first time period can be a time period one week prior to the time of the observed network traffic. The second seasonality can be a daily seasonality and the second time period can be a time period one day prior to the time of the observed network traffic.

The computing device can be further configured to maintain a count of detected outliers and identify an anomaly in network traffic if the count of detected outliers during a time period exceeds an anomaly threshold.

The computing device can be further configured to define a distribution identifying the variance of errors and use the variance to determine the expected variance about a the forecast of network traffic.

In some additional aspects, an anomaly detection system can include a computing device configured to maintain information related to raw errors in network traffic, determine errors associated with a time period centered about a week prior to a particular time, generate a week-based prediction interval based on the determined errors, the prediction interval providing an interval about a Holt-Winters based forecast for the particular time, and compare the network traffic for the particular time to the week-based prediction interval.

Embodiments can include one or more of the following.

The computing device can be further configured to determine errors associated with a time period centered about a day prior to a particular time, generate a day-based prediction interval based on the determined errors, the second prediction interval providing an interval about a Holt-Winters based forecast for the particular time, and compare the network traffic for the particular time to the day-based prediction interval.

The computing device can be further configured to determine if the network traffic is outside of both the week-based and day-based prediction intervals based on the comparison of the network traffic for the particular time to the week-based and day-based prediction intervals and identify an outlier if the network traffic is outside of both the week-based and day-based prediction intervals.

In some aspects, a computer implemented method can include generating a forecast of network traffic using a model that includes at least a first and a second seasonality, the forecast being based on previously observed network traffic at first and second time periods associated with the first and a second seasonality. The method can also include generating a prediction interval that extends above and below the forecast of the network traffic, the prediction interval being based on previously observed deviations from predicted network traffic. The method can also include comparing observed network traffic to the prediction interval and identifying an outlier if the observed network traffic is outside of the prediction interval.

Embodiments can include one or more of the following.

The method can also include generating the forecast using a Holt-Winters model having daily and weekly seasonality.

The method can also include initializing the model used to generate the forecast based on about two weeks of network traffic data and initializing errors used to generate the prediction interval using about one week of network traffic data.

The method can also include defining a distribution identifying the variance of errors and use the variance to determine the expected variance about a the forecast of network traffic.

In some additional aspects, a computer implemented method can include
maintaining information related to raw errors in network traffic and determining errors associated with a time period centered about a week prior to a particular time. The method can also include generating a week-based prediction interval based on the determined errors, the prediction interval providing an interval about a Holt-Winters based forecast for the particular time and comparing the network traffic for the particular time to the week-based prediction interval.

Embodiments can include one or more of the following.

The method can also include determining errors associated with a time period centered about a day prior to a particular time. The method can also include generating a day-based prediction interval based on the determined errors, the second prediction interval providing an interval about a Holt-Winters based forecast for the particular time. The method can also include comparing the network traffic for the particular time to the day-based prediction interval.

The method can also include determining if the network traffic is outside of both the week-based and day-based prediction intervals based on the comparison of the network traffic for the particular time to the week-based and day-based prediction intervals and identifying an outlier if the network traffic is outside of both the week-based and day-based prediction intervals.

Techniques for detecting changes in network traffic using time series outliers are disclosed. An outlier is an observation that does not lie within the typical variability expected in network traffic at a given time instant.

In some aspects, the detection techniques discussed herein can provide one or more of the following advantages. The detection techniques can produce low false-positives, are efficient and enable a system to detect outliers for ~10K time series in real-time (~5 minutes), and/or dynamically adapt to changing network conditions.

In some embodiments, it is believed that the time series outlier detection technique can reduce false positives by using similarity in traffic variability across multiple seasons to construct prediction intervals around each forecast/expected value. In some examples, the prediction intervals can be efficiently computed in O(1) time for each forecast step using a sliding window based algorithm.

In some embodiments, it is believed that the time series outlier detection technique can provide the advantage of continually adapting to network conditions at a reasonable speed allowing for long duration outliers to be detected, before the constructed prediction intervals incorporate them.

DESCRIPTION OF DRAWINGS

FIGS. 16a-d show an exemplary user interface for reporting anomalous events.

DETAILED DESCRIPTION

Figure 1:
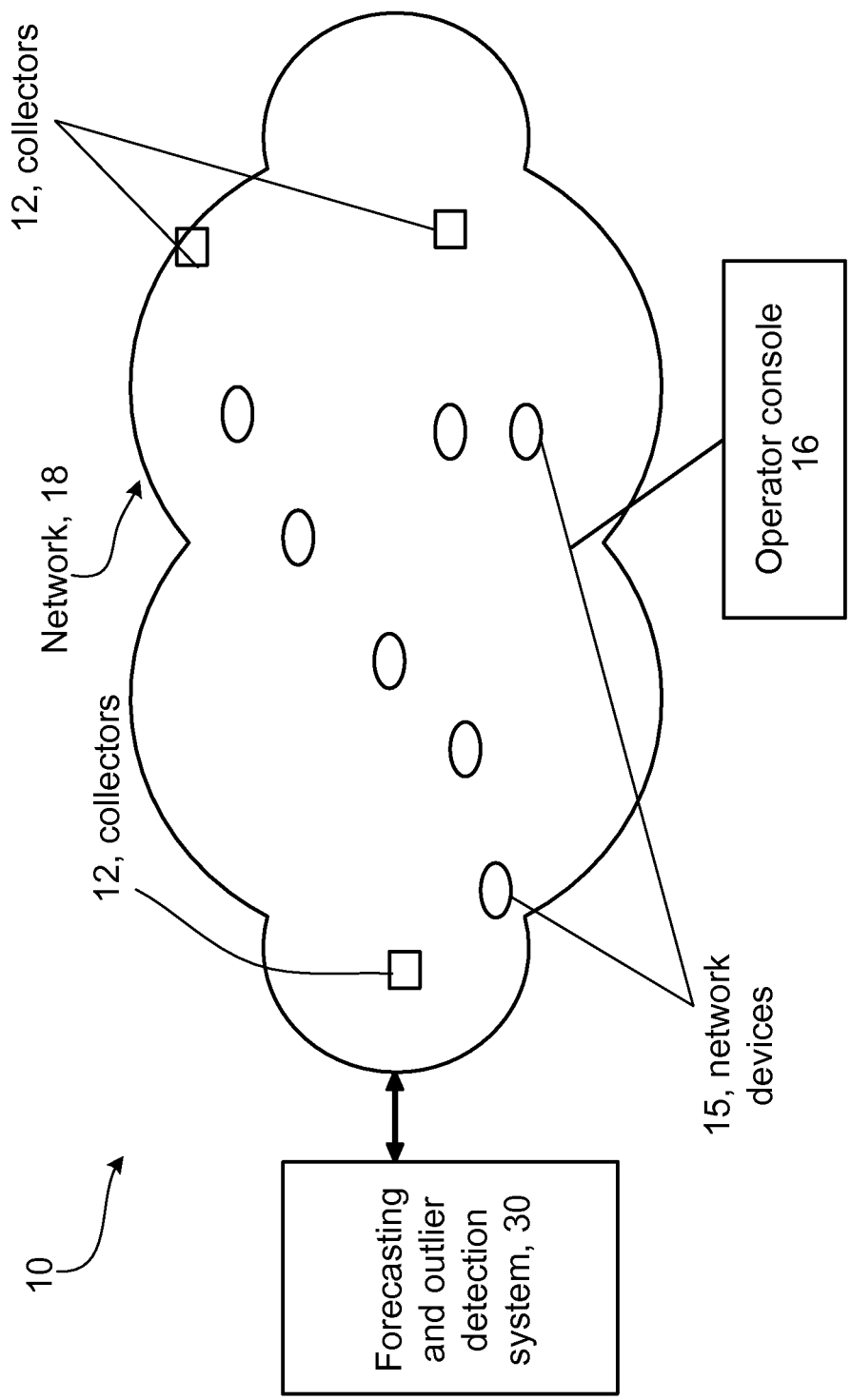
FIG. 1 is a block diagram of a network including anomaly detection.

Referring to FIG. 1, an anomaly detection system 10 for detecting anomalies in network traffic is shown. Anomalies in network traffic (e.g., deviations from a normal range of network traffic) can be detected for various analytic types such as link congestion, link outage, application performance, application availability, and so forth. The system 10 detects anomalies based on time-series activity and once detected, traffic is queried to identify significant changes during the time of the anomaly. These changes are analyzed across different network entities such as hosts, applications, interfaces, host pair services and/or host pairs. An event report is generated showing the spike or dip in network traffic, and the associated changes in network traffic for at least some of the analyzed network entities. The identified changes can be used to determine the cause and/or impact of the detected anomaly in network traffic.

The changes in the network traffic are identified by analyzing time series information for one or more variables which indicates how the monitored variable changes over time. Some examples of monitored traffic that generate time series information include byte traffic on an interface (e.g., Gbps router interface), the average response time of device (e.g., a computer, an application, a server, a group of servers), and the number of users accessing an application (e.g., a DNS). Network operators sometimes visually inspect such time series information to detect and characterize operational problems. However, it can be advantageous to inspect such time series information in an automated manner.

The system 10 includes flow collector devices 12, a forecasting and outlier detection system (system 30), and an operator console 16 that communicates with and can control collector devices 12 and the system 30. The flow collector devices 12 and the system 30 are disposed in a network 18. The flow collector devices 12 connect to network devices 15 such as switches, hosts, routers, etc. in line, or via a tap, e.g., using mirror, SPAN ports or other passive link taps. The flow collector devices 12 collect information about traffic properties e.g., bytes, packets, number of clients and periodically send information to the system 30 allowing the system 30 to analyze and store the data from the collectors 12 in a memory.

The forecasting and outlier detection system 30 analyzes traffic data collected by collector devices 12 to identify potential anomalies or changes in the network traffic across network devices 15.

System 30 establishes flow records from flow data received from the collectors 12. The flow records represent individual flows. Such data allows outlier detection system 30 to compare current data to historical data. The comparison data can be used by the outlier detection system 30 to determine if an anomaly exists. The system 30 profiles characteristics of the network traffic at the time of a detected anomaly and provides the information to a user via the operator console 16 or via another information delivery method such as e-mail.

Figure 2:
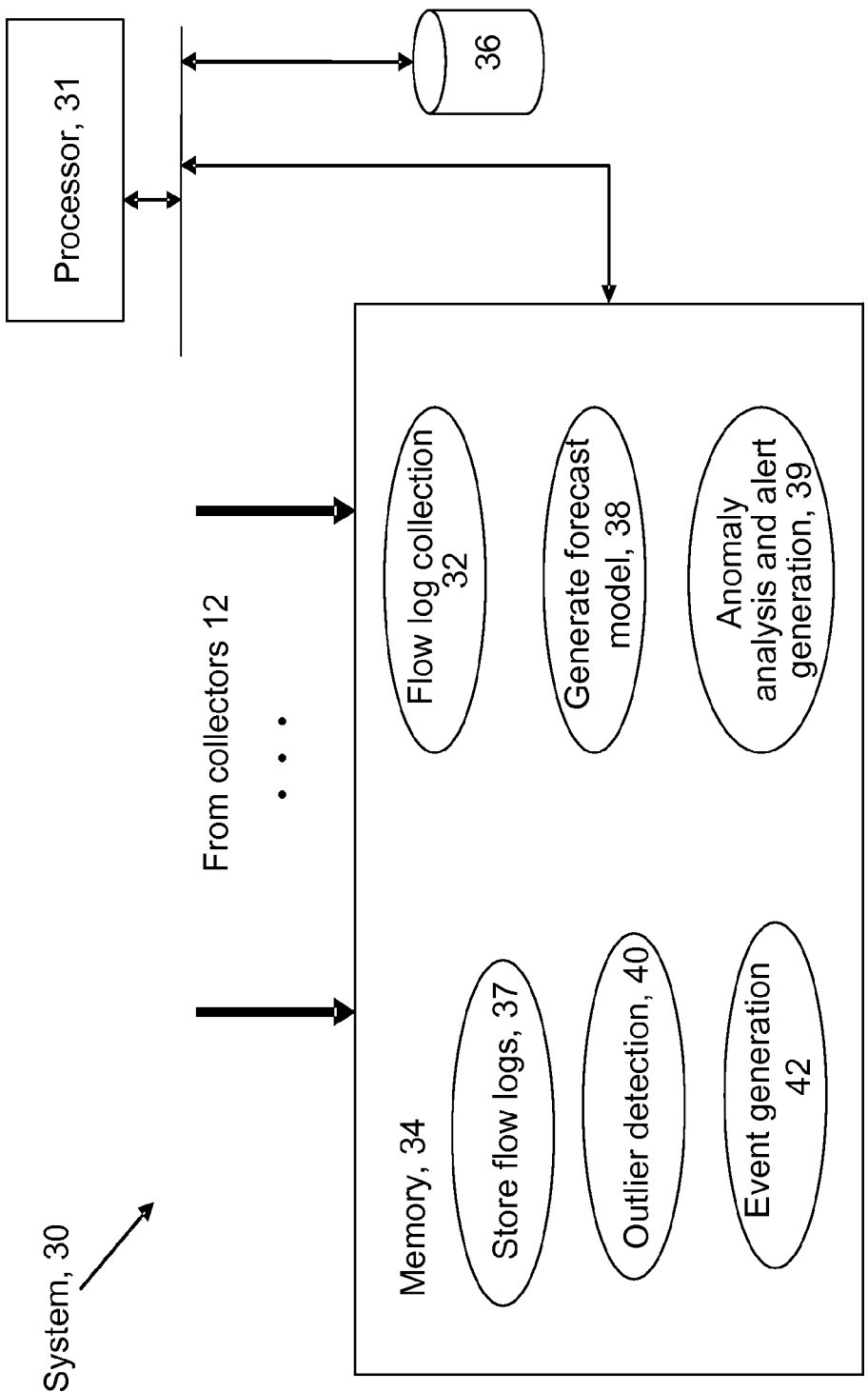
FIG. 2 is a block diagram depicting exemplary details of a anomaly detection system.

Referring to FIG. 2, the forecasting and outlier detection system 30 is a device (a general depiction of a general purpose computing device is shown) that includes a processor 31, memory 34, and storage 36. Other implementations such as Application Specific Integrated Circuits are possible. The system 30 includes processes 32 to collect flow data from flow collectors 12 and processes 37 to store the collected flow records. The outlier detection system 30 also includes processes to generate a forecast model 38, processes to detect outliers 40 based on the forecast and the network traffic information, anomaly analysis and alert generation processes 39, and event generation processes 42. The event generation processes 42 are used to report problems or changes (e.g., deviations from historical traffic) within the observed network traffic to the operator console 16 or cause the system 10 to take action in the network 18. The reports generated by the event generation process 42 can be provided to a user via a user interface, email, printer, or other device connected to the network. Additionally, the report can be stored in a memory and accessed by a user at a later time.

Figure 3:
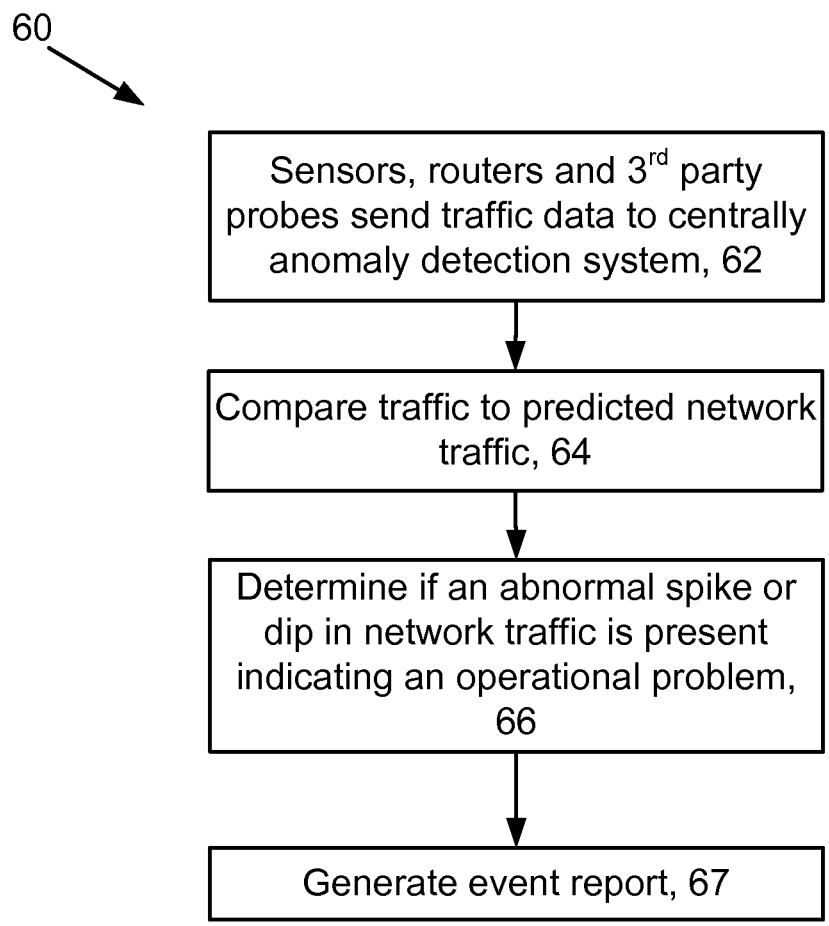
FIG. 3 is a flow chart of an anomaly detection process.

Referring to FIG. 3, an overview of exemplary anomaly detection process 60 is shown. Sensors, routers, ports, interfaces, and other $3^{rd}$ party probes send 62 traffic data to the system 30. The information sent to the system 30 includes various measured properties of the network traffic such as bytes, packets, and/or number of clients. After receiving the network traffic information from the sensors, routers, and other 3rd party probes, system 30 compares 64 the current network traffic to predicted network traffic. Based on the results of comparison 64, system 30 determines 66 if an abnormal spike or dip in network traffic or usage is present indicating an operational problem. If multiple anomalies are observed, the system 30 generates 67 an event report that provides information about the anomalous event. An exemplary event report is shown described in relation to FIGS. 16A-D.

Figure 4:
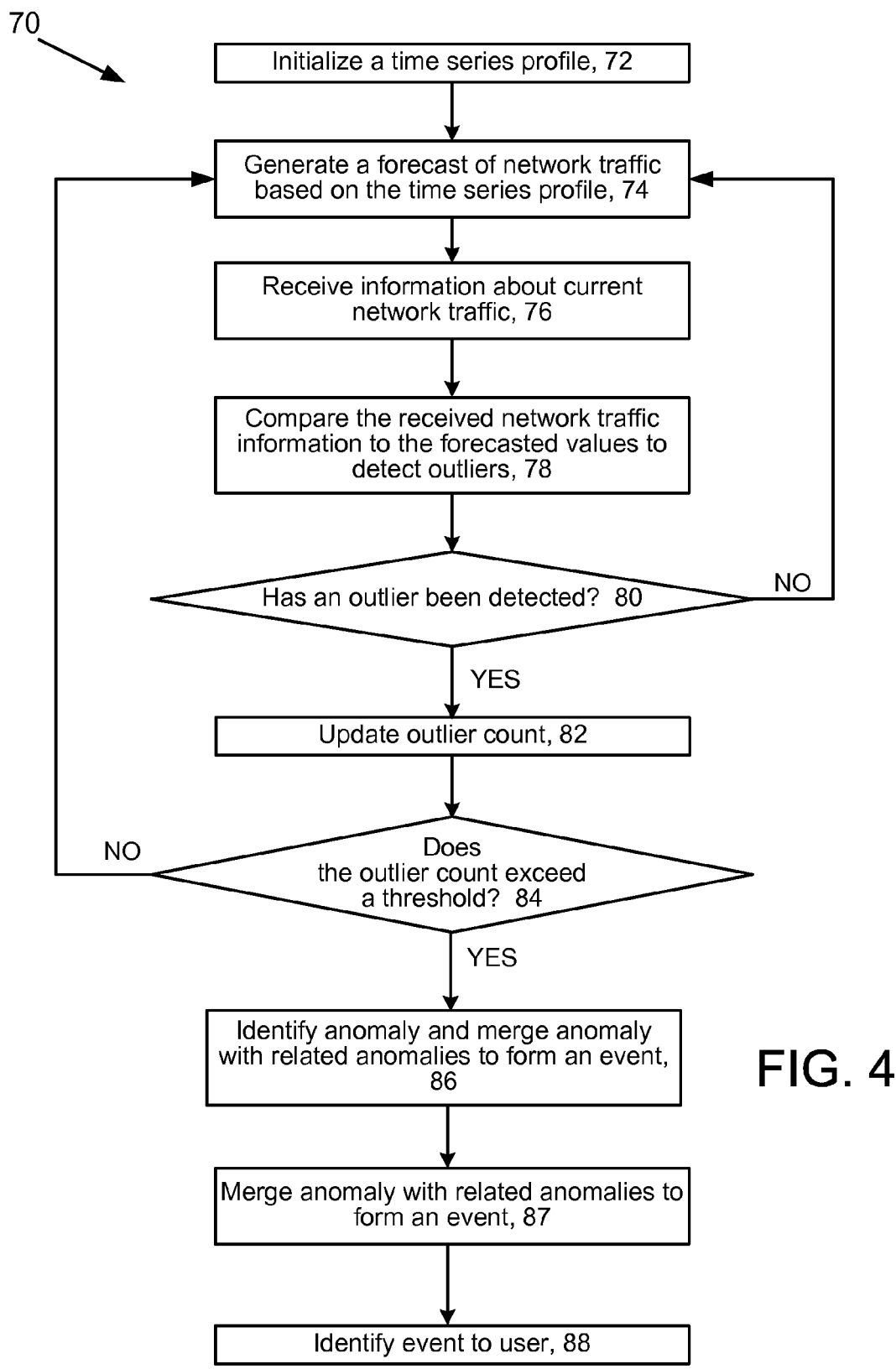
FIG. 4 is a flowchart of an anomaly detection and alert process.

Referring to FIG. 4, an exemplary embodiment of an anomaly detection process 70 utilizing multiple thresholds for identifying anomalous behavior in network traffic is shown.

The system 30 initializes 72 a time series profile based on the expected behavior for a particular metric based on historical traffic. The time series profile provides expected traffic values for a given time. The expected values can exhibit seasonality where the expected value is influenced by the values observed at one or more prior time periods. In some examples, a time series profile can exhibit daily and weekly seasonality where the expected traffic value at any time is dependent on the time-of-day and the day-of-week. In another example, a time series profile can exhibit weekly and monthly seasonality where the expected traffic value at any time is dependent on the week-of-month and the month-of-year. The time series profile can include expected values for a specific traffic set and a metric pair. In addition, the time series profile can include the past time series, the data used for initializing the profile, and variability data used for generating the normal range of expected traffic values. In general, the time series profile initialization 72 includes setting up a profile (e.g., expected behavior for a particular metric based on historical traffic) for the first time. Additional details regarding the initialization are discussed below (see, e.g., FIG. 11).

After the time series profile initialization is complete, the system 30 generates 74 a forecast of network traffic based on the time series profile. The forecast of network traffic includes a forecasted value (e.g., a value determined using a Holt-Winters forecasting method) and a prediction interval around the forecasted value. The forecasted value based on the Holt-Winters model changes based on observed network traffic and exhibits dual seasonality, for example daily and weekly seasonality.

In addition to determining a forecasted value for any given time, system 30 also determines a prediction interval around the forecasted value that provides an interval used to determine if network traffic is abnormally high or low. The interval is based on a variance of errors expected around the forecasted value given normal network activity. Since the interval defines the bounds of traffic considered to be normal, the sensitivity of the anomaly detection can be modified by changing the width of the prediction interval. More particularly, increasing the width of the prediction interval will reduce the sensitivity of the anomaly detection and decreasing the width of the prediction interval will increase the sensitivity of the anomaly detection.

System 30 receives 76 information about current network traffic and compares 78 the current network traffic to the forecasted values to detect outliers. An outlier is a deviation of actual traffic from the profile. For example, an outlier is detected if the observed network traffic lies outside of the prediction interval around the forecasted value.

The system 30 determines 80 if an outlier has been detected. If an outlier has not been detected, the system 30 continues to generate 74 forecasted values for subsequent time periods, receive 76 information about the network traffic, and compare 78 the network traffic to the forecasted values. On the other hand, if an outlier has been detected, the system 30 updates 82 an outlier count and determines 84 if the outlier count exceeds a threshold number of outliers for a particular time period. If the outlier count does not exceed the threshold, the system 30 continues to generate 74 forecasted values for subsequent time periods, receive 76 information about the network traffic and compare 78 the network traffic to the forecasted values. On the other hand, if the count does exceed the threshold, the system 30 identifies an anomaly in the network traffic 86. As noted above, an anomaly is an aggregation of multiple outliers that have occurred in a close enough time frame to be potentially significant. The threshold number of outliers sets the sensitivity of anomaly detection since an anomaly is not triggered based on observed outliers until the threshold is met. A single outlier is not necessarily enough cause an anomaly. Using a threshold number of outliers to identify an anomaly can provide the advantage of reducing the number of false positives.

The system aggregates or merges multiple anomalies on one or more metrics (e.g., different traffic properties that are measured. e.g., bytes, packets, number of clients) to identify an event 87. Merging multiple anomalies when identifying an event can provide the advantage of providing context to the anomaly. For example, if a problem occurs on a network, often multiple different metrics will be affected. When traffic anomalies occur at the same time for different monitored metrics, it can be beneficial to combine them into a single report.

Figure 5:
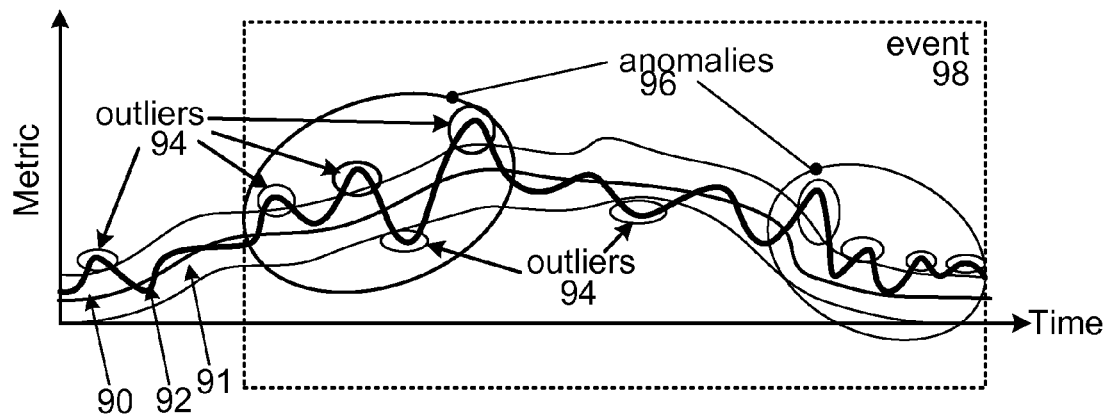
FIG. 5 is a graph of forecasted and actual traffic versus time.

Referring to FIG. 5 an exemplary graph of a metric over time is shown. As shown in the graph, the typical traffic 90 as predicted based on historical traffic varies over time. A prediction interval 91 based on a statistically normal range from typical provides an interval surrounding the predicted traffic. In order to determine if an outlier exists, the system 30 compares the observed traffic 92 for the time frame to the range identified by the prediction interval 91. If the observed traffic 92 lies outside of the prediction interval 91 an outlier 94 is identified. Outliers are identified on a per metric basis. Anomalies 96 are aggregations of multiple outliers 94 and events 98 are aggregations of anomalies 96. For example, an anomaly 96 can be identified when multiple outliers 92 are detected close together and an event 98 can include multiple merged anomalies 96. This is control by the minimum number of outliers per anomaly configuration variable (e.g., 1, 2, 3, 4, 5, 10, etc.).

Figure 6:
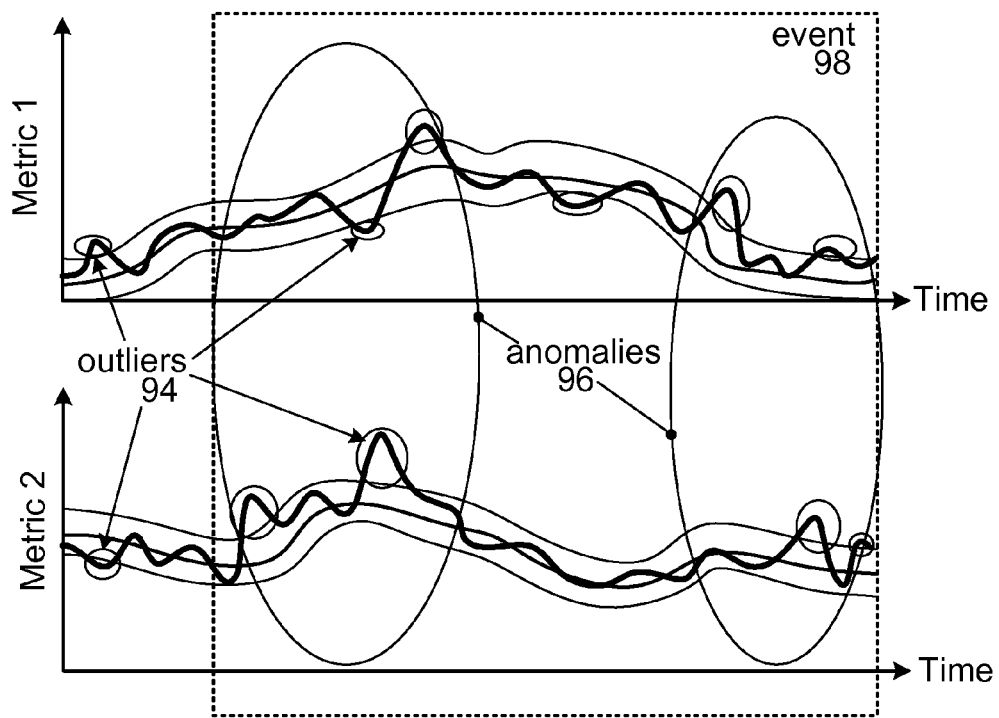
FIG. 6 is a graph of multiple metrics versus time.

Referring to FIG. 6 an exemplary graph of multiple metrics over time is shown. Similar to the single metric example described above in relation to FIG. 5, in a multiple metric example, outliers 94 are traffic deviations per metric, anomalies 96 are aggregations of multiple outliers 94, and events 98 are aggregations of one or more anomalies 96. Multiple metric anomaly detection differs from single metric anomaly detection in that an anomaly can be based on outliers 94 from one or more of the analyzed metrics or even from all analyzed metrics of network traffic. Thus, if a threshold number of outliers 94 are observed prior to triggering an anomaly, these outliers can be observed across multiple different metrics. Similarly, an event 98 can merge multiple anomalies 96 detected across all metrics.

In both the single and the multiple metric cases after the initial detection of an anomaly based on multiple observed outliers, future, outliers can be merged into the anomaly rather than generating a new anomaly. Merging of multiple outliers is determined by an outlier merge interval, defined as the maximum time between end of the last outlier and the start of the next outlier. For example, the merge interval can be twice the aggregation interval. For example if the aggregation interval is 15 minutes, then all outliers that start within 30 minutes can be aggregated into the same anomaly. Aggregation of anomalies can provide the advantage of reducing the number of events and notices sent to a user based on one or a few problems on the network and/or can help to pool information related to an anomaly into a common location to facilitate review of the information.

In general, an outlier can be classified as either a spike or dip, depending on whether it deviates above or below the typical range. For each analytic type, the metric will be monitored for only spikes, only dips, or a combination of both spikes and dips. If a given analytic is only watching for spikes, then the occurrence of dips are ignored and are not counted in terms of the number of outliers required to produce an anomaly. It is possible that an outlier occurs but does not trigger an anomaly.

As described above, an event is the aggregation of multiple anomalies over a longer duration. If the anomaly is part of a long running network activity (order of several hours to days), then a single event is generated to notify the user of the activity rather than generating multiple individual events based on the time of occurrence of the anomalies (e.g., it is not co-occurrence that relate these anomalies). The amount of time an event is kept in memory, to be aggregated with any new anomalies, is determined by a keep alive time which is a preset time threshold. When the first anomaly occurs, a new event is posted to event manager and assigned a unique event ID. At the time of posting, event details are collected and saved with this event ID, including a time-series graph showing the entire time span of the event, as well as detailed traffic tables for the anomaly. Each time an additional anomaly is detected that is aggregated into this event, the event is updated. The event details are modified to reflect the most recent anomaly. Since the event is updated with the additional anomaly information rather than generating a new event, the data about the network traffic and anomalies related to the network traffic behavior is collected in a centralized location.

Exemplary Analytics

One exemplary analytic that system 30 monitors is network interface congestion which is identified by whether utilization on an interface has spiked above a threshold utilization (e.g., 80%, 90%, 95%) or is congested compared to typical (e.g., has over 20% more traffic than typical, has over 40% more traffic than typical, has over 50% more traffic than typical).

Figure 7:
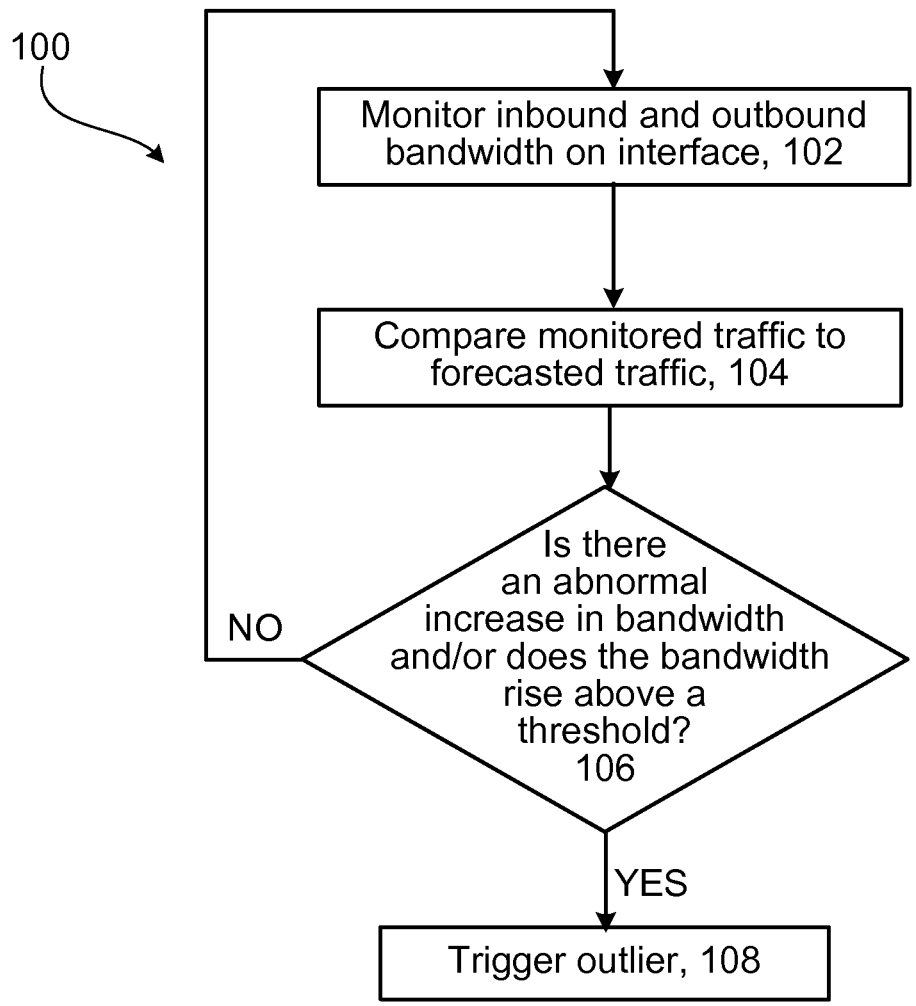
FIG. 7 is a flow chart of a network congestion monitoring process.

As shown in FIG. 7, in order to determine whether a network interface is congested the system monitors 102 inbound bandwidth on an interface and/or outbound bandwidth on an interface. The system 30 compares 104 the monitored inbound/outbound bandwidths on the interface to a forecasted value for the traffic and determines 106 if there is an abnormal increase of inbound or outbound bandwidth on a given interface which rises above a threshold (inbound or outbound). An outlier is triggered 108 if an abnormal increase of inbound or outbound bandwidth is detected.

Another exemplary analytic that system 30 monitors is network interface outages which are identified by whether interface traffic has dropped below a threshold percentage utilization (e.g., 25% utilization, 10% utilization, 5% utilization) or is uncharacteristically low compared to typical (e.g., 50% of typical traffic, 30% of typical traffic, 10% of typical traffic).

Figure 8:
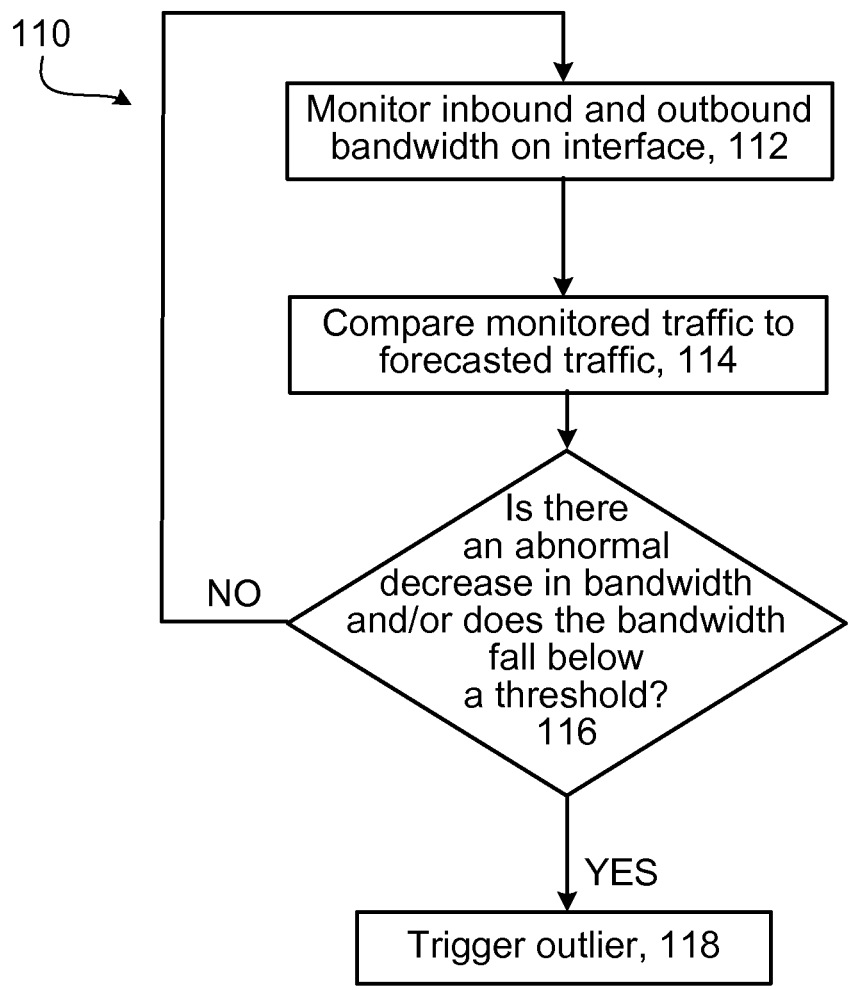
FIG. 8 is a flow chart of a network interface outage monitoring process.

As shown in FIG. 8, in order to determine whether a network interface outage exists, the system monitors 112 inbound bandwidth on an interface and/or outbound bandwidth on an interface. The system 30 compares 114 the monitored inbound/outbound bandwidths on the interface to a forecasted value for the traffic and determines 116 if there is an abnormal decrease of inbound or outbound bandwidth on a given interface which falls below a threshold (inbound or outbound). An outlier is triggered 118 if an abnormal decrease of inbound or outbound bandwidth is detected.

Another exemplary analytic that system 30 monitors is application performance which is related to problems in the response time for users of the application. The application performance analytic determines whether a user has been impacted and/or the number of number of connections made by clients of the application has decreased significantly.

Figure 9:
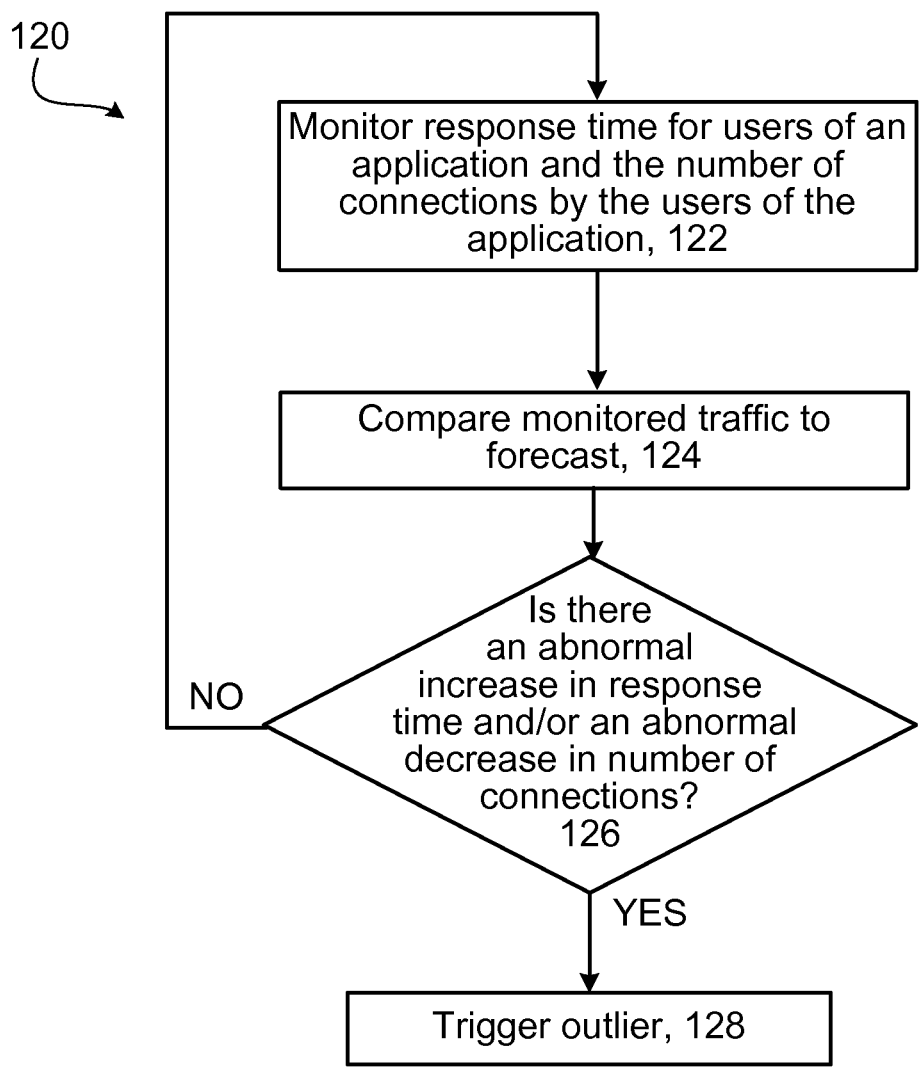
FIG. 9 is a flow chart of an application performance monitoring process.

As shown in FIG. 9, in order to determine whether a application performance problem exists, the system monitors 122 the response time for users of an application and/or whether the number of connections by users of the application has decreased significantly. The system 30 compares 124 the response times and number of connections and determines 126 if there is an abnormal increase in response time or an abnormal decrease in the number of connections. An outlier is triggered 128 if an abnormal increase in response time or an abnormal decrease in the number of connections is detected.

Another exemplary analytic that system 30 monitors is application availability which is related to whether the application has become unavailable to significant number of users on the network.

Figure 10:
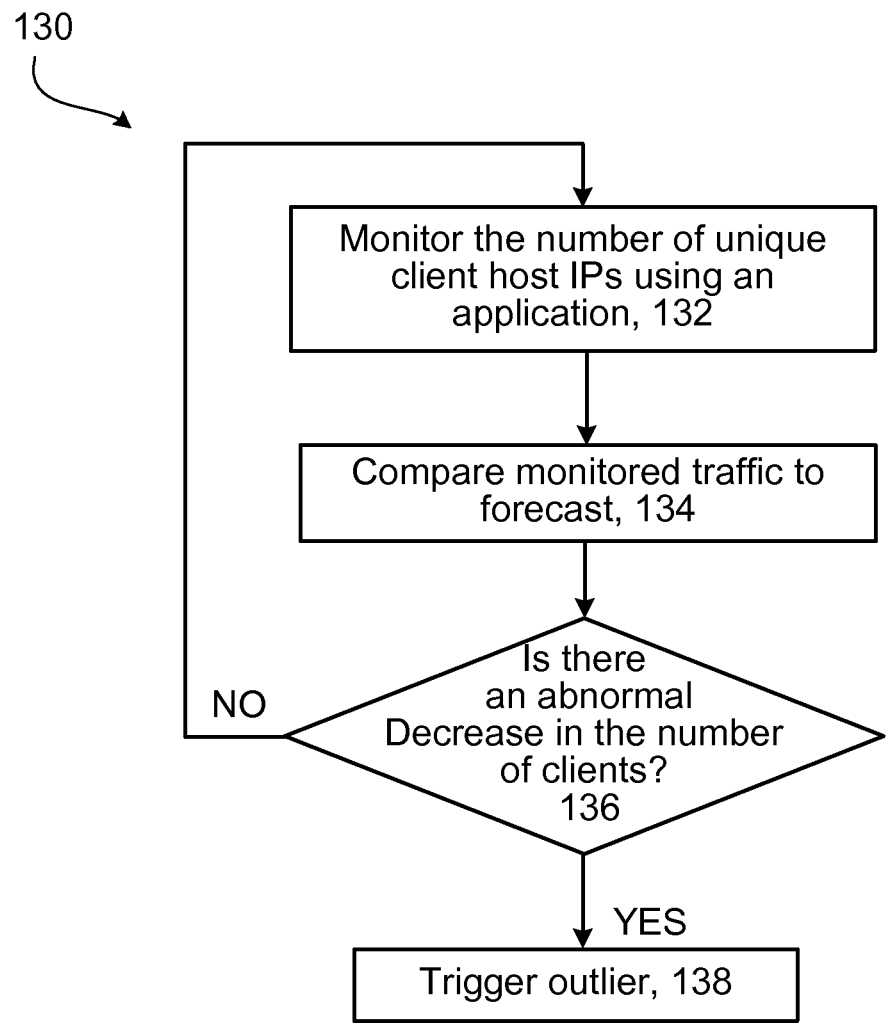
FIG. 10 is a flow chart of an application availability monitoring process.

As shown in FIG. 10, in order to determine whether a application availability problem exists, the system monitors 132 the number of unique client host IPs using the specified application(s). The system 30 compares 134 the number of unique client host IPs to a forecasted value and determines 136 if there is abnormal decrease in the number of clients. An outlier is triggered 138 if an abnormal decrease in the number of clients is detected.

Exemplary analytics of network interface congestion, network interface outages, application performance, and application availability were described above, however, other analytics could be used to monitor other types of network traffic.

Anomaly Detection Using Holt-Winters Forecasting

As described above, outliers, anomalies, and events are detected by comparing observed traffic to forecasted traffic. The forecasted values for network traffic and the prediction intervals surrounding the forecasted values can be calculated using various methods. In some examples, a Holt-Winters exponential model can be used to forecast seasonal time series. Holt-Winters modeling provides a forecast value at a future time by capturing past trend and seasonal variations. The multiplicative seasonality version of a Holt-Winters calculation assumes an additive trend, and estimates the local slope by smoothing successive differences of the local level.

To determine if a given observed traffic value is an outlier confidence bands or intervals which measure deviation of the traffic from the forecasted value for each time instant can be used. The measure of deviation is a weighted average of the absolute deviation, updated via exponential smoothing. Prediction intervals are confidence intervals for a random variable and indicate accuracy of a forecast. For the particular case of Holt-Winters forecasting using multiplicative seasonality and linear trend, there are no known closed-form expressions for computing prediction intervals. Since theoretical formulas are not available, an empirical method (e.g. a method based on past observation) based on model-fitting past errors is used to determine the prediction intervals. Model-fitting past errors and experiments on real network data, can provide an empirical method specifically for the Holt-Winters forecasting algorithm with multiplicative seasonality.

The Holt-Winters model uses a set of recursions to generate forecasts of series containing a locally linear trend. Since network time-series often exhibit both daily and weekly seasonality, in some embodiments, Taylor's double-seasonal version of Holt-Winters can be used to forecast network traffic. In the following discussion it is assumed that the two seasons are daily and weekly. However, other seasonality is possible. In general, the daily and weekly could be replaced with any two seasons where one seasonal cycle is an integral multiple of another. For example, hourly and daily, weekly and monthly, daily and monthly, and so forth.

Figure 11:
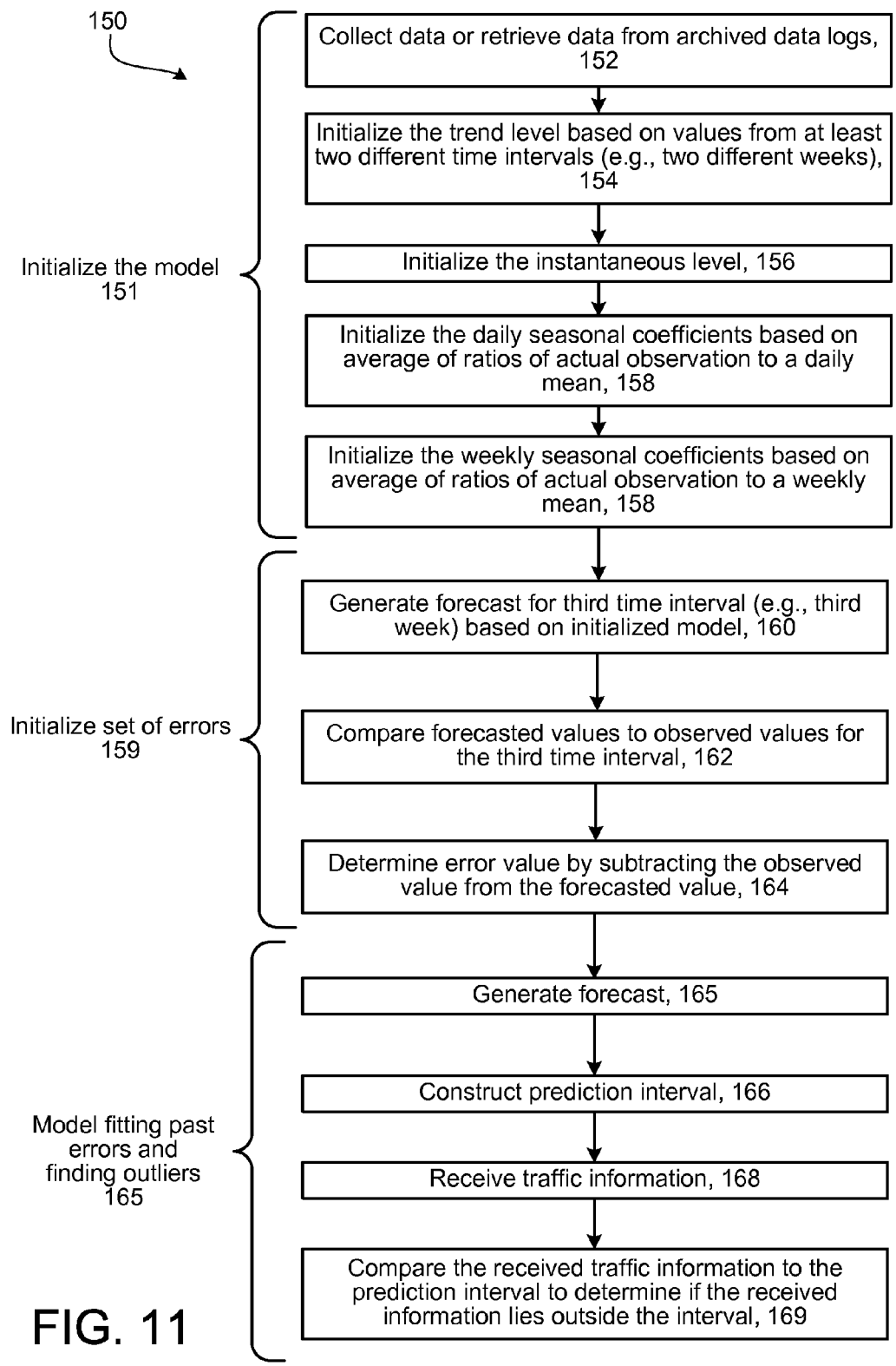
FIG. 11 is a flow chart of an initialization and outlier detection process.

Referring to FIG. 11, a process 150 for initializing and using the Holt-Winters model to detect outliers in observed network traffic is shown. The process 150 includes initializing 151 the model, initializing 159 a set of errors, and model fitting 165 of past errors and finding outliers 165, each of which is discussed in more detail below.

Initializing the Model

As shown in FIG. 11, generating a forecast using the Holt-Winters, model involves initializing 151 the model from past data. Initializing the model includes collecting 152 data used to initialize the forecast either by collecting data until the required number of values are available or by querying archived logs.

Figure 12:
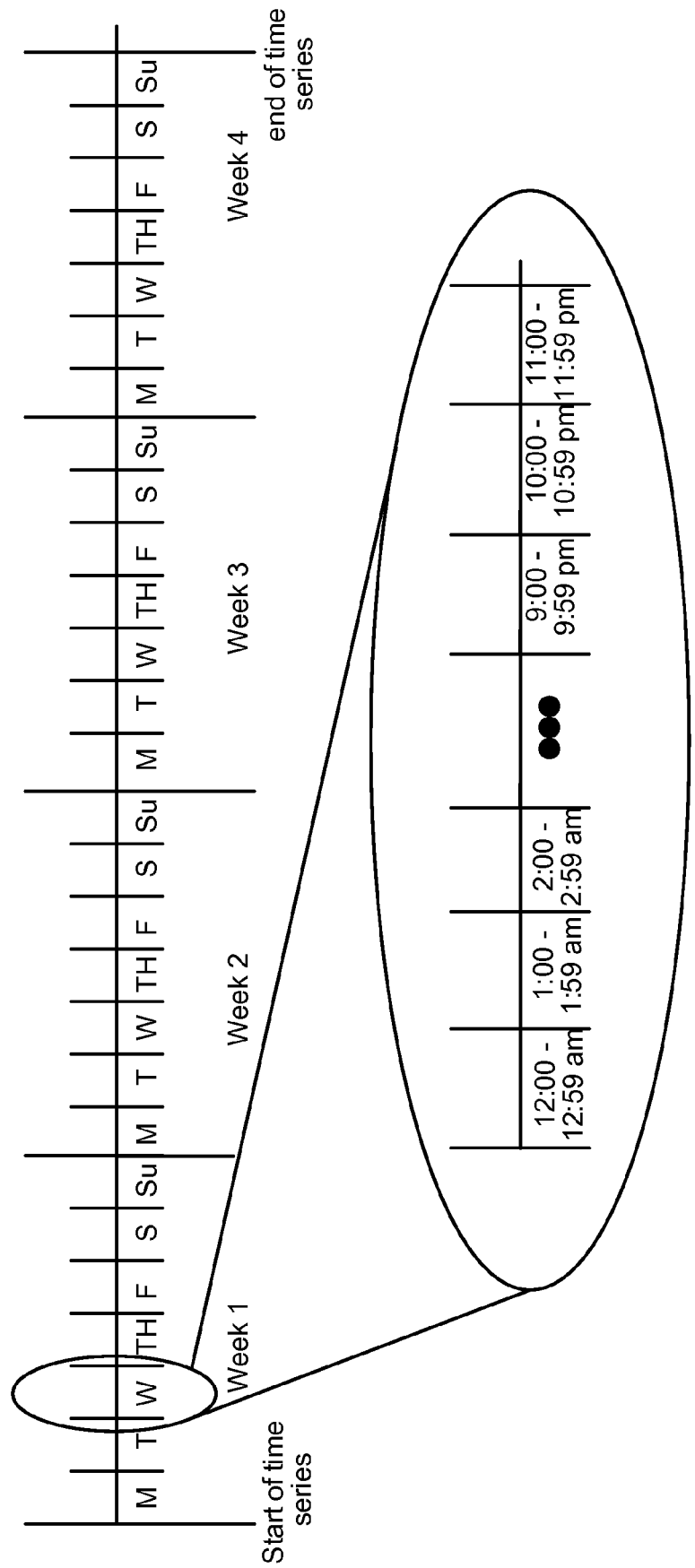
FIG. 12 is a diagram of a time series.

The amount of data used to initialize the model is based on the seasonality used in the model. For example, as shown in FIG. 12, the collected data can include at least two types of seasonality. In the example shown in FIG. 12, both daily and weekly seasonality exist. For example, each week is broken down into seven days (M, T, W, Th, F, S, Su) such that weekly seasonality can be observed by comparing the traffic for a particular time on a particular day to the traffic at the same time on the same day in the previous week (e.g., 9:00-9:15 am on Monday in week 2 can be compared to 9:00-9:15 am on Monday in week 1). The daily seasonality can be observed by comparing the traffic for a particular time to the traffic at the same time on the previous day (e.g., 9:00-9:15 am on Tuesday in week 2 can be compared to 9:00-9:15 am on Monday in week 2).

If X is the number of data points in a week and the input time-series has 4*X data points (e.g., 4 weeks of data) where each is aggregated over T minute intervals for a total duration of 4*X*T minutes. For certain metrics, such as response time or number of unique hosts, the aggregation function over an interval is not a simple sum: rather the metrics are the mean and the count of distinct entries respectively. Let start_ts, end_ts be the start and end time of this series. As such, in this example values for 4 weeks; duration=4*X*T minutes.

Referring back to FIG. 11, when both daily and weekly seasonality is modeled, at least two weeks of data is used to initialize the model. The double-seasonal Holt-Winters model state has four components: instantaneous level, trend and set of daily and weekly coefficients. The trend level is initialized 154 based on values from at least two different time intervals such as two different weeks. For example, the initial trend level can be initialized according to the following:

$$\text{initial\_trend} = \frac{\text{mean(values in first week)}}{\text{number of values in a week}} - \text{mean(values in second week)}$$

The initial level is also initialized 156. For example, the initial level can be initialized according to the following:

initial_level=mean(values in first week)−
½*initial_trend.

Finally, the initial values for daily seasonal coefficients and weekly seasonal coefficients are determined 157 and 158. The daily seasonal coefficients can be set as average of the ratios of the actual observation to the corresponding daily mean. The initial values for the weekly seasonal coefficients can be set as average of the ratios of the actual observation to the corresponding weekly mean, divided by the corresponding initial value of the daily index.

Initializing Errors

After the model has been initialized, a set of errors is initialized 159. The initialized set of errors is used to generate a prediction interval for each future forecast based on the variance of the past errors around the same period of time, one day and one week ago.

Initializing the set of errors includes generating 160 forecasts for the third week using the initialized Holt-Winters model. These forecasts are compared 162 against observed values in the third week to generate 164 error values. If, as in the example above, each week includes X observations, X errors will be generated. One error value is generated for each value in the third week by subtracting the observed value from the forecasted value.

Figure 13:
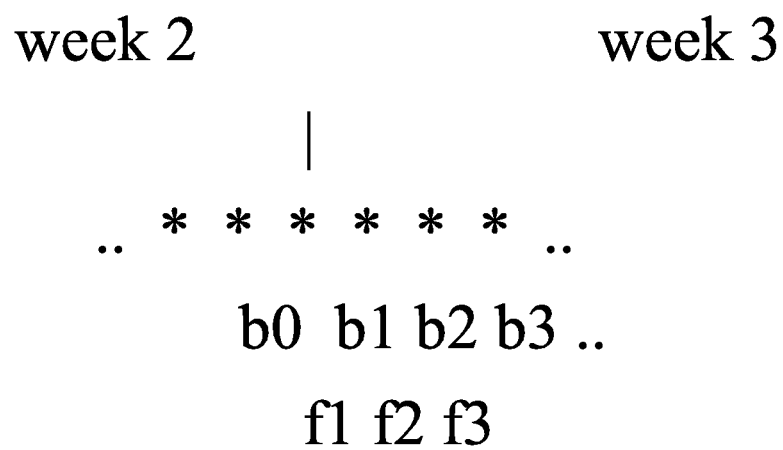
FIG. 13 is a diagram of network traffic data.
Figure 14:
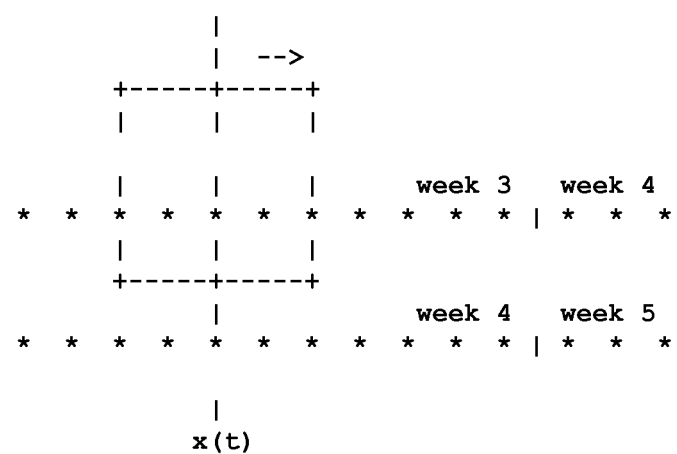
FIG. 14 is a diagram of network traffic data and forecasting windows.

For example, FIG. 13 shows time series data points going from week 2 to 3 as a sequence of asterisks. The observed value b0 (the last value of week 2) is used to forecast the first value at week 3, value f1. The error e1 is computed as e1=f1−b1. Note that if a Laplace distribution is used, e1=|f1−b1|. The past variance (based only on observed values) is not used to compute the error band because the model already incorporates some of this variability. To the extent that the model captures the variability, the forecasts will already include the variability. So in order to construct the prediction interbal, past errors are observed to determine the uncertainty of the forecast.

Using Holt-Winters recursive equations, forecasts f2, f3 etc. are generated from previous observed values b1, b2 etc. This results in a week of errors, one for each data point in week 3. This process is continued into week 4 to generate a total of X+(W+1)/2 errors where W is the size of the window of past errors that will be used to determine distributional parameters for a future error, and subsequently used to construct the prediction interval of the forecast at that point. During the process of generating forecasts the model is continually updated.

At the end of week 3, an initialized Holt Winters model and a set of errors for the error model exists.

Referring back to FIG. 13, if three weeks of data are used to generate the initialized model and set of errors, then the first two weeks of data are used for the initialization of the Holt Winders forecasting model and the third week of data is used for the error model. As such, the Holt Winters initialization includes 2*X values where X is the number of data points in a week. The error model includes X+[(W+1)/2] values, where X is the number of data points in a week and W is the size of the window. The initialization 151 and initialization 159 result in an initialized model and set of past errors. While in the example above 4*X data was used to initialize the model, less data can be used. For example, in some embodiments, the model is initialized based on only 3*X+(W+1)/2 values, and not 4*X.

Model-Fitting Past Errors and Finding Outliers

Figure 15:
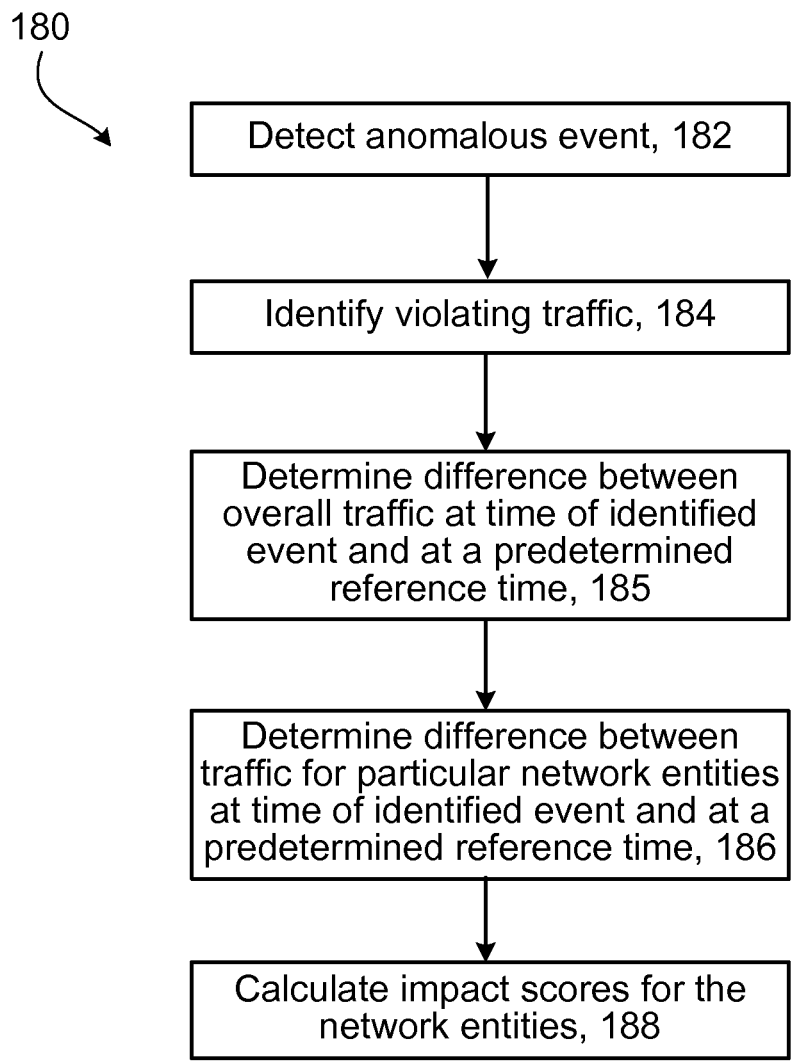
FIG. 15 is a flow chart of a impact score calculation process.
Figure 16A:
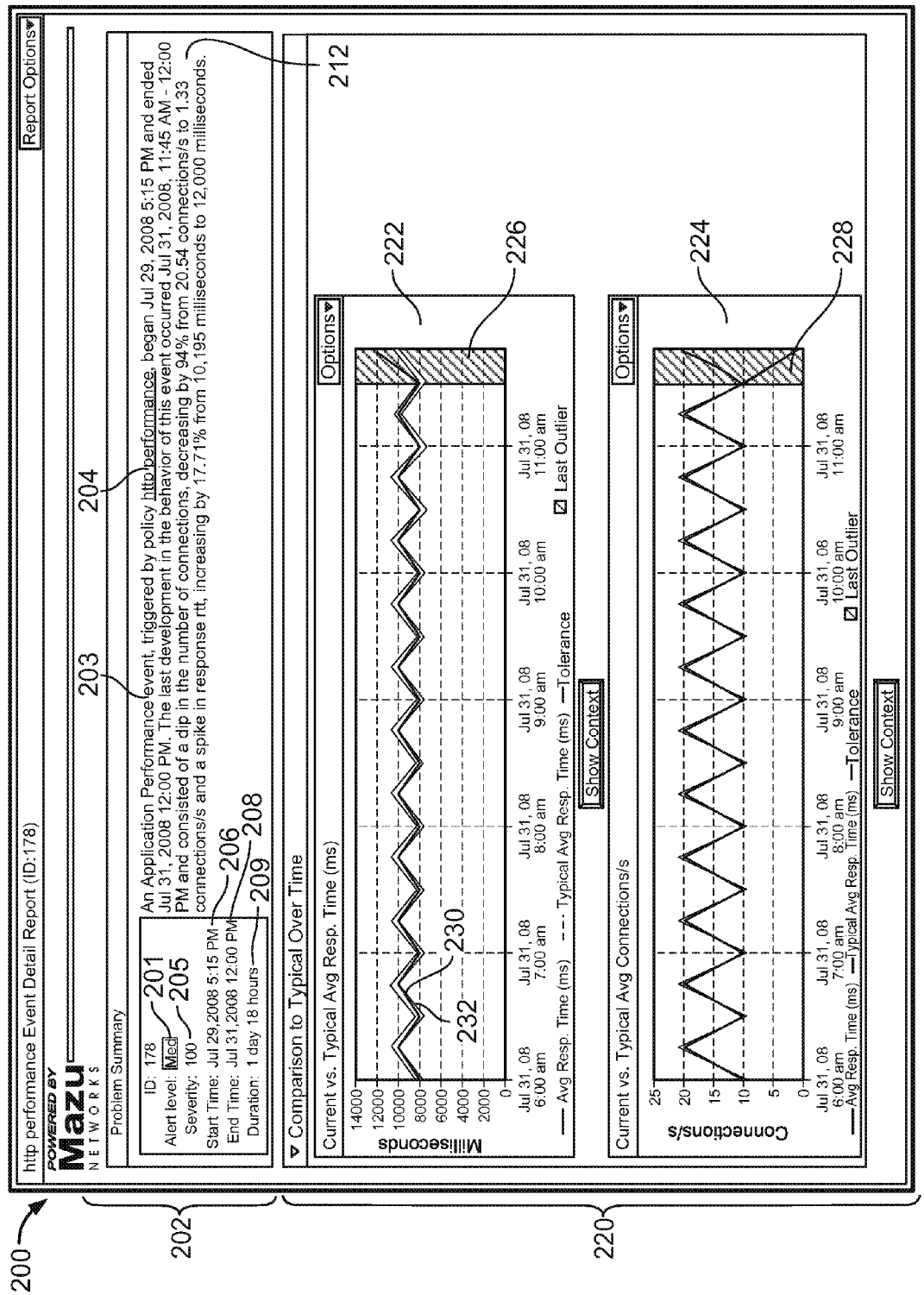
Figure 16C:
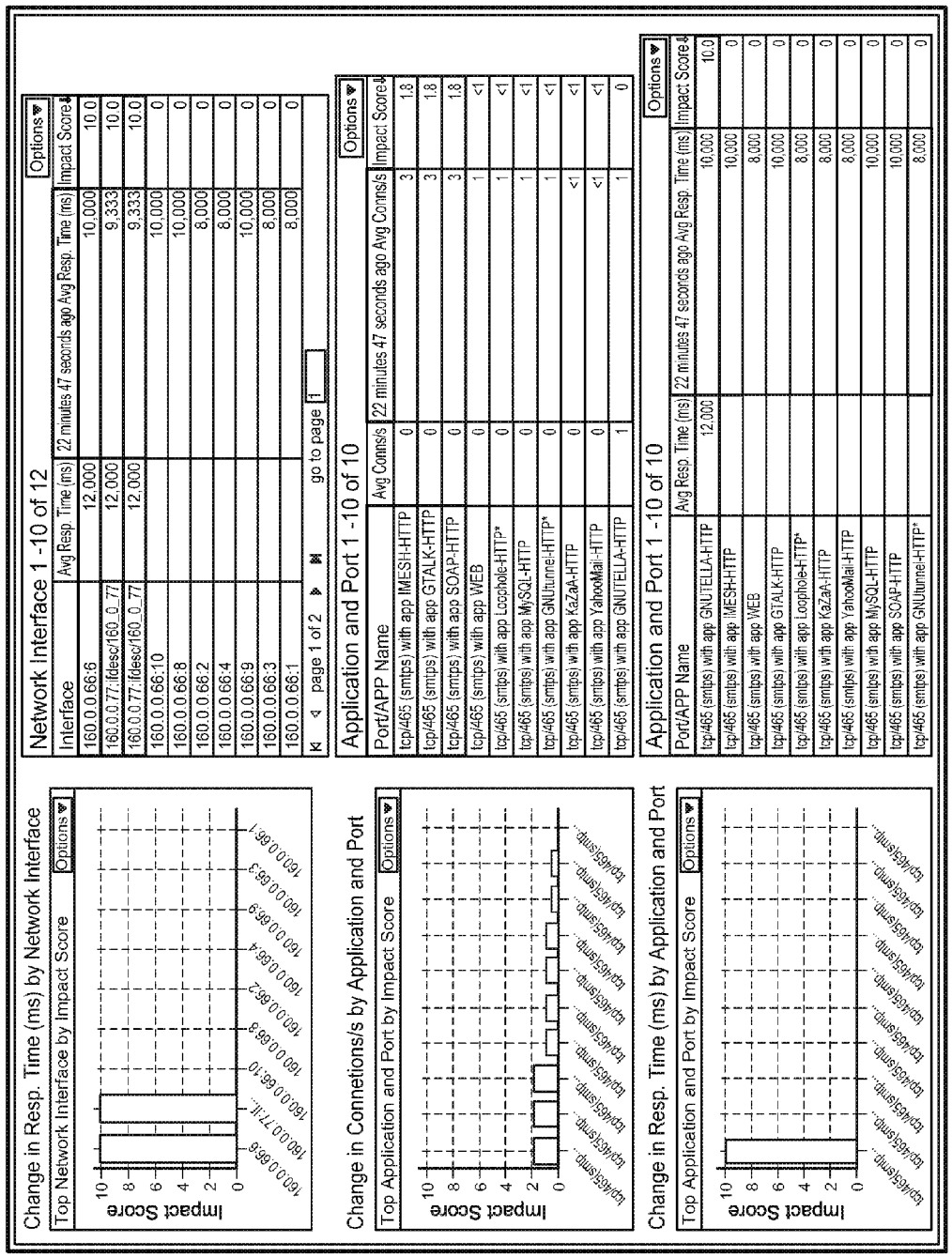
Figure 16D:
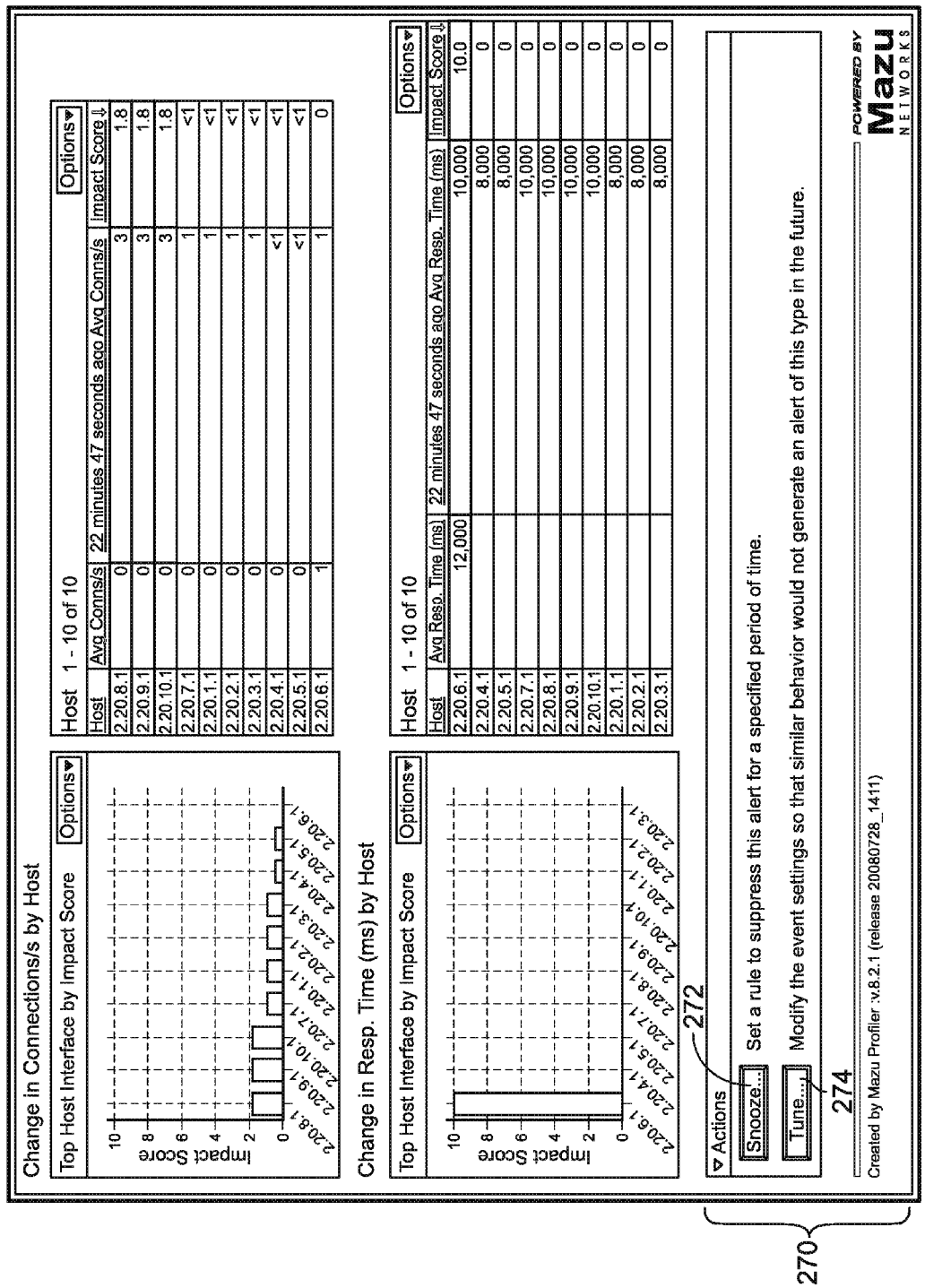
Figure 17:
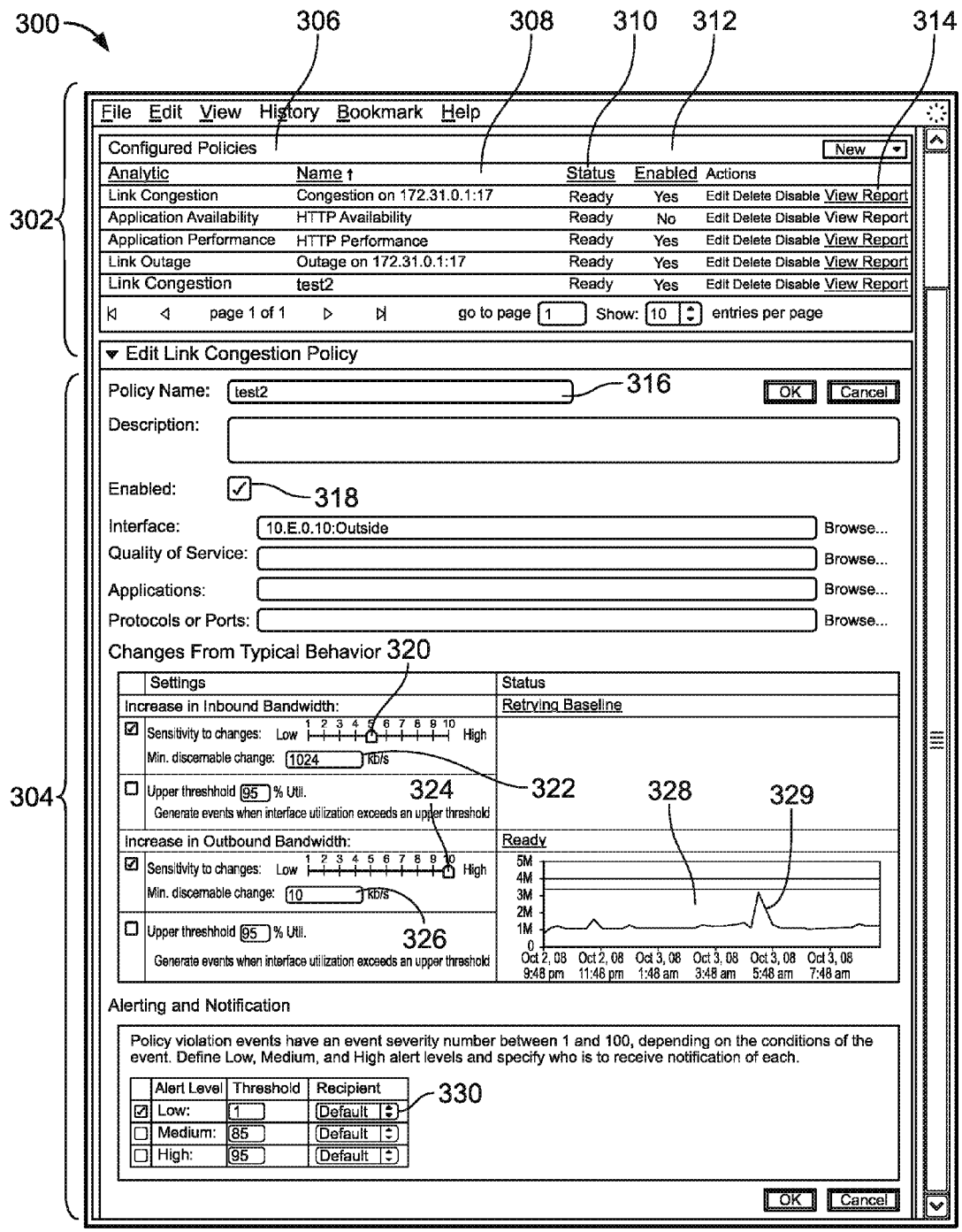
FIG. 17 shows an exemplary user interface for tuning.

Based on the acquired data, forecasted values are generated 165 and prediction intervals are generated 166 for each new forecast. In order to generate the forecast, the Holt-Winters model is used (e.g., as described above). In order to generate the prediction intervals two windows, each of size W, are maintained. As shown in FIG. 15, with every new one-step-ahead forecast, the windows are slid right one step to include the next error and discard the oldest error in the window.

In the above example shown in FIG. 15, the forecast error corresponding to the observation x(t) is assumed to have similar distributional properties as the errors within the window of size 5 (W=5) centered on a value exactly one week ago. It is important to use raw errors and not smoothed errors, so their distributional properties are maintained.

At time t, given mean_w(t) and sigma_w(t), the parameters of the distribution of W errors in the corresponding window of time a week ago, then the approximate empirical 100*(1-alpha) % prediction interval (meaning, the probability than an observed value lies within the interval is 100*(1-alpha)%) for forecast at time t is given by:

[forecast(t)+(mean_w(t)+Z(alpha/2)*sigma(t)), forecast(t)+(mean_w(t)−Z(alpha/2)*sigma(t))]

where Z(alpha/2) denotes the appropriate percentage point of a standard normal distribution. Note that Z(alpha/2) should be replaced with the percentage point of a Chebyshev or Laplace distribution, if those distributional assumptions are made. A similar prediction interval can be constructed using the window of errors one day ago.

The system receives traffic information 168 and compares 169 the traffic information to the prediction interval to determine if the received information lies outside the interval. The observation x(t) is an outlier if it lies outside both the prediction interval based on daily seasonality and the interval based on weekly seasonality.

The model fitting and finding of outliers 165 is repeated for observed values beyond those used in initialization, to generate prediction intervals for the forecast, and compare against the raw observed value to find an outlier. As such, the intervals used to determine if an outlier exists are continually updated. This provides the advantage of allowing the intervals to change over time to compensate for trends in usage.

Computational Cost and Memory Use

In some embodiments, each forecast step takes O(1) time using Holt-Winters method. Mean and standard deviation can be computed in O(1) for Normal (using incremental mean and deviation formulas) and Chebyshev distributions. For Laplace distribution, incremental formulas are not available, and the cost of computing mean and sigma is O(W) where W is the number of values in the error window. Typically, W<<X, where X is number of values in a week. For example, if values are aggregated over 15 mins., a window size of 12 points may suffice (3 hours over the past week or past day), and X=672.

In order to maintain sliding windows over past errors, at least (X+(W+1)/2) past errors need to be recorded for each time series, and each seasonality where X is the number of values in that season. This is in addition to memory required by Holt-Winters for computing forecast which is O(X) values.

Error Windows

The initial choice of distributions for error windows can be based on experiments on real network traffic collected from multiple sites. First, the randomness of errors using difference-sign and turning-point tests should be ensured. It is believed that Normal and Laplace distributions provide good fits for modeling past errors (e.g., using Cramer-Von tests). Window sizes can have a significant effect on the performance of the anomaly detection system. Large window sizes may result in periods of high variability and low variability being modeled as part of the same window. Small sizes may result in poor estimate of distributional parameters. Ultimately, the sizes are data dependent. For example a window size of W=24 is believed to work well with an aggregation interval of 15 minutes.

The performance of the above method, and the distribution and window size choice, can be determined by computing the percentage of post-initialization observations that fall within the computed prediction intervals and comparing it against the configured or target alpha. In some embodiments, Chebyshev interval bounds are typically wider than Normal or Laplace bounds which may result in better overall performance, but may result in more false-negatives.

Tuning Sensitivity of Detection

Users can change the sensitivity of outlier detection by increasing or decreasing alpha in the error window calculation. Using asymmetric intervals provides greater control. For example, one can increase the sensitivity to dips and decrease the sensitivity to spikes by providing a higher value of k1 than k2:

$$[\text{forecast}(t)+(\text{mean\_}w(t)+k1*\text{sigma}(t)),$$

$$\text{forecast}(t)+(\text{mean\_}w(t)-k2*\text{sigma}(t))]$$

In general, a window of past errors is chosen for the computation of the prediction interval. Examples of such windows of past errors are one week ago or one day ago. The errors are then fitted to a distribution whose parameters are mean(t) which is the mean and sigma(t) which is the standard deviation. The values of k1 and k2 represent the number of standard deviations from the mean. Thus user input can be mapped to a range of (k1, k2) pairs. In addition, by checking for outliers using different (k1, k2) pairs of values, we can provide instant feedback to the user regarding the number of outliers that would have been detected if the setting had always been the newly chosen value.

Minimum Discernable Change

There are various causes of false-positives in the anomaly detection system. One exemplary cause of false-positives occurs when accurate forecasts in the past result in a very narrow tolerance band for the current forecast (e.g., a narrow error or prediction interval). When the prediction interval is narrow minor deviation from this band would be considered an outlier. Another exemplary cause of false-positives occurs when observed values for network traffic are too close to 0. For example, when the overall network traffic is low, the user may not care about a fluctuation from 0.01 to 0.1 bytes/sec change in bandwidth. Yet, without lower limits on the width of the tolerance band, such deviations would be considered outliers as well.

In some embodiments, in order to limit the number of false positives, a user configurable input to outlier detection, called Minimum Discernible Change can be provided by the user and/or can be preset in the system. The minimum discernible change provides a minimum width of the tolerance region above or below a forecast value. For example, if the calculated width of the prediction interval above or below a forecast value based on past outliers is greater than the minimum discernible change then the calculated width is used for determination of outliers. If, on the other hand, the calculated width of the prediction interval above or below a forecast value based on past outliers is less than the minimum discernible change then the width set by the minimum discernible change is used to detect outliers.

Network Impact Analysis

As described above, in some embodiments, after system 30 detects an anomalous event based on time-series activity, network traffic can be queried to locate the source and/or impact of the anomaly on the network.

FIG. 15 shows an exemplary process 180 for determining an impact score related to the impact of anomalous activity (e.g., identified events) on particular network entities such as hosts, applications, interfaces, host pair services or host pairs. The system 30 detects 182 an anomalous event (e.g., using one or more of the methods described herein) and identifies 184 the violating traffic. Based on the identified traffic, the system analyzes the overall change 185 in network traffic at the time of the anomaly. For example, if the detected anomaly was related to a large spike in the network traffic, the change in network traffic can be calculated by subtracting the network traffic from a prior time period (e.g., one day ago, one week ago, one hour ago) from the network traffic at the time of the anomaly. The system also analyzes changes 186 in the level of network traffic for particular network entities using the same previous time period as compared to the traffic during the time of the anomaly. The network entities for which the impact analysis is performed are selected based on the analytic type. For example, the entities for which an impact score is calculated for the link congestion analytic can include servers, application and ports; the entities for which an impact score is calculated for the application performance analytic can include network segments, client groups, servers, etc. The system computes changes across multiple network entities such as hosts, applications, interfaces, host pair services or host pairs. For example, the detected anomaly was related to a large spike in the network traffic, the change in network traffic could be calculated by subtracting the network traffic from a prior time period for particular network entities (e.g., ports) from the network traffic at the time of the anomaly. Based on the determined changes in the total traffic and the traffic for particular network entities, the system calculates 188 impact scores for the individual network entities. The impact score is calculated by taking a ratio of the change in the network traffic for a particular network entity to the total change in network traffic. The calculated impact score can be analyzed to determine the impact or contribution of the particular network entity to the overall observed anomalous activity on the network. For example, the highly impacted entries (entries marked yellow in the Impact Details tables) can be computed by choosing entries that are within a MAX_DISTANCE from the entry with maximum impact score. This MAX_DISTANCE is typically 2.0. Only the highly impacted entries are shown in Impacted Infrastructure and Applications section.

For example, if an observed anomaly relates to an observed increase in network traffic from 10 to 110 connections/sec and traffic on port A increased from 10-20 connections/sec and traffic on port B increased from 20-60 connections/sec, the impact scores for port A and B would be 1 and 4, respectively. More particularly, the calculated ratios for port A would be (20−10)/(110−10)=0.1 and the impact score for port B would be (60−20)/(110−10)=0.4. These ratios are scaled to a 1-10 scale.

An advantage of the impact scoring mechanism compared to retrieving the top K entities involved in the outlier (which is commonly done), is that network entities that are the top initiators of the network activity are not necessarily the ones that changed the most. The impact scoring can identify the network entities that changes the most during the time period of the outlier. Also, since the contribution of each entity is determined in order to compute the impact score, the information can be used to additionally sort by the metric (e.g., Avg Conns/s) to obtain the top K entities if desired.

Severity Computation

In some embodiments, the system can calculate a severity of an observed event. The severity can provide a scaled score that provides a numeric value of the potential impact of the event. The user can determine what actions to take in response to the event based on the calculated severity of the event. For example, the user may determine to take no action if the calculated severity is low and may decide to take immediate action if the severity is unusually high. The user may also determine to follow-up on particular events based on the severity value.

The severity of a reported event can be based on many factors, including whether any important network entities have been affected. To begin with, we base it solely on the magnitude of change from upper or lower limit of the tolerance band. Calculating the severity from the upper or limit of the tolerance band (e.g., from the prediction interval) provides various advantages in comparison to calculating a severity based on the forecasted value of the network traffic. For example, if one were to calculate the severity based on the forecasted value (as opposed to the limit of the tolerance band) an outlier that differs greatly from the forecasted value, but is only slightly above or below the tolerance band could be assigned a high severity when the observed value is actually only slightly outside of the normal range of values for the network traffic.

The change from upper or lower limit of the tolerance band is normalized using the mean(t) and sigma(t) corresponding to what was used to compute the upper or lower limit (as described above). Since the tolerance region for each data point is based on distributional parameters of a unique window of errors in the past, the severity value is also specific to that time.

In the example provided below, it is assumed that only weekly seasonality was employed, and that the observed value exceeded the upper limit. k1 is the sigma multiplier used to compute the upper limit of tolerance band. MAX is the number of deviations above/below the limit that corresponds to severity of 100.

$$\text{observed\_deviation} = (\text{observed}(t) - \text{forecast}(t) - \text{mean\_}w(t))/\text{sigma}(t)$$

$$\text{severity} = ((\text{observed\_deviation} - k1)/\text{MAX}) * 100$$

For example, mean_w(t)=0, k1=3, sigma(t)=20, forecast(t)=100, observed=200, MAX=3 then $$\text{upper}(t) = 100 + 3*20 = 160$$

$$\text{observed\_deviation} = (200 - 100 - 0)/20 = 5$$

$$\text{severity} = (5-3)/\text{MAX} = 66.6.$$

Network Anomaly and Impact Reporting

In order to provide useful information to a user regarding anomalous network activity, the system 30 generates an event report that shows the time-series spike or dip that triggered the event, and most impacted network infrastructure and applications based on the calculated impact scores. The top entities contributing to the anomalous activity are determined based on the difference between the violating traffic and reference traffic (e.g., traffic observed 1 week ago) as described above. Identification of the most impacted network infrastructure and applications can be advantageous because those network entities are likely to be a cause or impact of the anomaly. In one exemplary event report, the change (delta) analysis is presented as a breakdown based on (1) Host-pairs: client, server pair (2) Host-pair services: client, server, protocol, port tuple (3) Servers: server hosts (4) Applications: protocol, port, application tuple and/or (5) Network interfaces: device IP, interface index.

FIGS. 16A-16D shows an exemplary user interface 200 for reporting of network events and their impact of various devices within the network. The user interface 200 includes a problem summary portion 202, a traffic comparison portion 220, an impacted infrastructure and applications portion 240, an impact details portion 250, and an action portion 270. The portions 202, 220, 240, 250, and 270 provide a collection of information in a single location (e.g., on a single user interface) that a user views in order to make decisions with respect to detected anomalies and events within the network. For convenience of illustration the user interface is drawn on separate drawing pages. However, the user interface portions 202, 220, 240, 250, and 270 are depicted as a single web page. Other arrangements such as multiple, e.g., linked, web pages are possible. The user interface portions 202, 220, 240, 250, and 270 provide both summary level information and detailed analysis of impact information in a single location (the web page or linked web pages), which can be advantageous in allowing an individual to identify the source of a problem by viewing information on a single user interface.

The problem summary portion 202 includes information related to the identified anomalous event and the overall impact of the event on the network. The summary portion 202 includes a textual summary of the event 212 and a table based summary 211 of the event details. The table based summary 211 provides summary level details about the level of alert 201 and the severity of the event 205. This information can provide a brief summary of the likely impact of the event on the network. The table-based summary 211 also includes an indication of the duration of the event 209 and the start time 206 and end time 208 of the event. The textual summary 212 provides a short (e.g., one or two sentences) description of the event and its impact on the network. The summary portion 202 includes a short paragraph summary of the type of anomaly detected on the network and the impact of the anomaly on the network. The summary portion 202 identifies the type of event 203 and the policy that triggered the event 204. The indication of the policy that triggered the event 204 can include a link (e.g., as shown in 204) to another user interface that includes details of the policy. The summary portion 202 also provides information about the percentage increase/decrease in network traffic that resulted in the event and the actual network traffic numbers from the time period of the anomalous event and a previous time period. Providing both the percentage and the actual values can allow a user to determine the actual impact of the event on the network.

The traffic comparison portion 220 provides graphical representation(s) of the network traffic during the time period near the anomalous event. For example, the user interface 200 shows a graphical representation 222 of the current versus typical response time and a graphical representation 224 of the current versus typical connections. The graphical representation includes an indication of the average network traffic for the monitored traffic type 232 and an indication of the observed network traffic 230 during the time period of the anomaly. The time frame and traffic that resulted in the generation of an outlier can be highlighted in the graph.

The impacted infrastructure and applications portion 240 provides a summary of the applications and infrastructure that have been impacted by the anomalous event and the level of severity of the impact. The impacted infrastructure and applications portion 240 can include both a graphical representation (e.g., representations 244 and 246) of the severity of the impact on various network functions and/or entities as well as summary data (e.g., 242a-232f) that describes the impact on the network entity. The summary can include links (e.g., hyperlinks) to other user interfaces or other portions of the same user interface that show details of the impacted network entity or application. Both the percentage and the actual values of the network traffic for each of the impacted entities can be displayed to allow a user to determine the actual impact of the event on the network entity.

The impact details portion 250 provides graphical and/or table-based summary information about the impact of the anomalous event on various network entities. The graphical and/or table-based summary information can be sorted according to impact score or other metrics. The impact details portion 250 can include a graphical representation (e.g., graphical representation 252) of the impact score versus the network entity for the most highly impacted entities. The impact details portion 250 can also include a table based summary of the impact information. The table based summary can identify the network entity (e.g., as shown in column 254), provide information about the average network traffic (e.g., as shown in column 256), provide information about the network traffic during the time period of the anomalous event (e.g., as shown in column 258), and provide the impact score (e.g., as shown in column 260). Separate graphical representations and/or table based information can be used to show the impact on the network entities for various observed network features. For example, in user interface 200, separate graphs are provided for the change in connections by network interface, change in response time by network interface, chance in connections by application and port, change in response time by application and port, change in connections by host, and change in response time by host.

The action portion 270 provides a portion of the user interface for a user who views the information regarding the anomalous event to take action on the event. Depending on the type of action the user selects, the user may be directed to another user interface. In one exemplary implementation, the action portion 270 can provide the user with the ability to snooze the alert (e.g., by selecting button 272) or the ability to tune the settings which are used to generate the event (e.g., by selecting button 274). In the user decides to snooze the event, the event is suppressed for a period of time (e.g., for a set time period such as 10 minutes, one hour, one day, or until another outlier occurs). This can allow a user to continue to monitor the characteristics of the network prior to taking action with respect to a particular observed event. If the user decides to tune the event settings, the user can modify the settings so that similar behavior would not generate an alert similar to the currently identified alert. This can be beneficial in reducing the number of events that the user reviews so that the user can focus on the events that are most important. The user could also change the event settings to identify the event based on a lower level of anomalous behavior so that the user would be identified more quickly of events or would be identified of behavior of a smaller magnitude.

While the user interface 200 described above includes each of portions 202, 220, 240, 250, and 270, a user interface could include more or fewer portions. For example, the impact details section 250 could be provided on another screen rather than on the same user interface 200.

Figure 18:
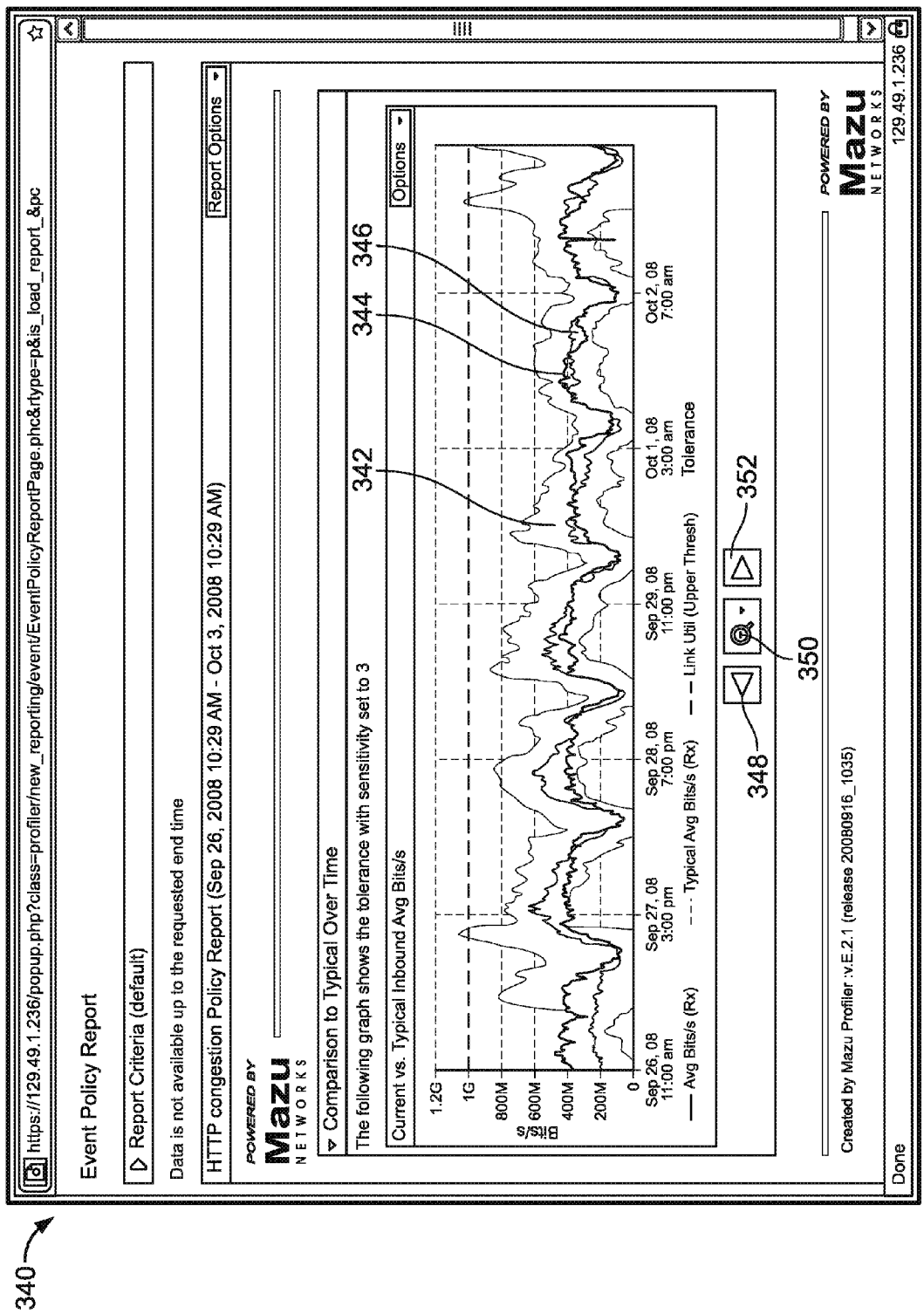
FIG. 18 shows an exemplary user interface for reporting the historical results of an analytic.

FIG. 18 shows an exemplary user interface 300 of a tuning report for enabling a user to change the settings for monitoring and reporting of network events and their impact of various devices within the network. In general, the tuning report user interface 300 allows the user to move a slider 320, 324 to change the values of "minimum discernible change" (e.g., the minimum width of the tolerance region above or below a forecast value) and set a value for utilization thresholds (e.g., set absolute upper or lower limits which if exceeded would cause an "outlier").

The tuning report user interface 300 includes a configured policies portion 302 and an editing portion 304. The configured policies portion 302 lists the types of analytics available for monitoring (e.g., as shown in column 306) and the name of the particular analytic (e.g., . . . , as shown in column 308). For each analytic (e.g., each row in the table), a status column 310 indicates the status of the analytic and an enabled column 312 indicates whether the analytic is currently enabled on the system. An actions column 314 provides the user with options for each analytic including editing the analytic (e.g., using editing section 304), deleting the analytic, disabling the analytic, and viewing a report. If the user selects to edit the analytic, an editing portion 304 associated with the particular analytic is shown on the tuning report interface 300.

The editing portion 304 includes a settings section in that includes a slider 320 that allows the user to change the values of "minimum discernible change" for the analytic and a entry block 322 in which the user can enter a value to set at the utilization thresholds that provide absolute upper or lower limits which if exceeded would cause an "outlier". The editing portion 304 also includes a time series graph 328. The time series graph refreshes each time the user changes a setting specific to a metric monitored by this policy. The time series graph 328 provides the user with an indication of how many "outliers" would have been generated from this policy, had the settings been what the user now set it to.

The time series graph 328 is updated by applying the new settings (sensitivity, min. discernible change and thresholds) on the historical data about the metric, and displaying a time series that effectively shows the newly computed "normal range" or tolerance (green region). Whenever, an observed value 329 is outside the tolerance, an "outlier" would have been generated, and may have caused an event. Thus, the graph 328 provides a qualitative feedback on how many "outliers" would have been generated historically, had the settings been what the user has now set it to. The correspondence between an outlier and an event is not a simple one-to-one, due to outlier thresholds, and merging across outliers that occurs. Therefore, the graph 328 does not provide a quantitative feedback.

FIG. 19 shows an exemplary user interface 340 accessible from the "View Report" link in the Configured policies section 302 for every policy that has a initialized profile (e.g., policies for which the forecasting model and errors have been initialized from the data we have collected and we are ready to compute prediction intervals and find outliers).

The detail report user interface 340 shows the historical observed and forecast values, tolerance region, utilization thresholds (absolute limits) if any. The purpose of this report is to show what has happened in the past for every metric monitored in this policy, so a user can infer why the user is (a) seeing numerous events, (b) seeing no events for this policy, or (c) simply requires a report on past behavior of this policy. The user can then use the Tuning report to modify the settings for the analytic. Historical changes in sensitivity or "min. discernible change" that the user has completed, will be reflected by changes in width of the tolerance region 342. Historical changes to thresholds will be reflected in the line that shows the threshold value that was applied to determine outliers at any given instant. The user interface 340 provides zooming and panning options (e.g., using buttons 348, 350, and 352).

The system described herein can be implemented in digital electronic circuitry, or in computer hardware, firmware, software, web-enabled applications, or in combinations thereof. Data structures used to represent information can be stored in memory and in persistence storage. Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired, and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention.

What is claimed is:

1. A computer program product residing on a non-transitory computer readable medium for intrusion detection, the computer program product comprising instructions for causing a processor to:
   for each of a plurality of multiple different network traffic metrics,
      generate a forecast of network traffic using a model, the forecast being based on previously observed network traffic;
      generate a prediction interval that extends above and below the forecast of the network traffic, the prediction interval being based on previously observed deviations from predicted network traffic;
      compare observed network traffic to the prediction interval;
      identify an outlier for the metric if the observed network traffic is outside of the prediction interval during a time period;
      compute a count of outliers for the metric that are identified during the time period; and
      identify an anomaly in network traffic for the metric only when the computed count of outliers identified for the metric during the time period is greater than or equal to two and the computed count of outliers identified for the metric during the time period exceeds an anomaly threshold for the metric that is greater than or equal to one; and
   merge anomalies for each of the multiple different network traffic metrics to identify a single event.

2. The computer program product of claim 1, wherein the computer program product further comprises instructions for causing the processor to provide information about the network traffic at the time of the event to a user.

3. The computer program product of claim 1, wherein the computer program product further comprises instructions for causing the processor to:
   generate the forecast using a model that includes at least a first and a second seasonality, the forecast being based on previously observed network traffic at first and second time periods associated with the first and the second seasonality.

4. The computer program product of claim 3, wherein the computer program product further comprises instructions for causing the processor to generate the forecast using a Holt-Winters model having daily and weekly seasonality.

5. The computer program product of claim 3, wherein:
   the first seasonality comprises a weekly seasonality;
   the first time period comprises a time period one week prior to the time of the observed network traffic;
   the second seasonality comprises a daily seasonality; and
   the second time period comprises a time period one day prior to the time of the observed network traffic.

6. The computer program product of claim 4, wherein the computer program product further comprises instructions for causing the processor to:

initialize the model used to generate the forecast based on at least two weeks of network traffic data; and initialize errors used to generate the prediction interval using at least one week of network traffic data.

7. The computer program product of claim 4, wherein the instructions for causing the processor to generate the prediction interval comprise instructions for causing the processor to define a distribution identifying the variance of errors and use the variance to determine the expected variance about a the forecast of network traffic.

8. The computer program product of claim 7, wherein the forecast and the prediction interval are based on network data associated with a sliding window of prior network data.

9. An anomaly detection system, comprising:
a computing device configured to:
for each of a plurality of multiple different network traffic metrics,
generate a forecast of network traffic using a model, the forecast being based on previously observed network traffic;
generate a prediction interval that extends above and below the forecast of the network traffic, the prediction interval being based on previously observed deviations from predicted network traffic;
compare observed network traffic to the prediction interval;
identify an outlier for the metric if the observed network traffic is outside of the prediction interval during a time period;
compute a count of outliers for the metric that are identified during the time period; and
identify an anomaly in network traffic for the metric only when the computed count of outliers identified for the metric during the time period is greater than or equal to two and the computed count of outliers identified for the metric during the time period exceeds an anomaly threshold for the metric that is greater than or equal to one; and
merge identified anomalies for each of the multiple different network traffic metrics to identify a single event.

10. The anomaly detection system of claim 9, wherein the computer device is further configured to:
generate the forecast using a model that includes at least a first and a second seasonality, the forecast being based on previously observed network traffic at first and second time periods associated with the first and the second seasonality.

11. The anomaly detection system of claim 10, wherein the computing device is further configured to generate the forecast using a Holt-Winters model having daily and weekly seasonality.

12. The anomaly detection system of claim 10, wherein:
the first seasonality comprises a weekly seasonality;
the first time period comprises a time period one week prior to the time of the observed network traffic;
the second seasonality comprises a daily seasonality; and
the second time period comprises a time period one day prior to the time of the observed network traffic.

13. The anomaly detection system of claim 11, wherein the computing device is further configured to:
initialize the model used to generate the forecast based on at least two weeks of network traffic data; and
initialize errors used to generate the prediction interval using at least one week of network traffic data.

14. The anomaly detection system of claim 11, wherein the computing device is further configured to define a distribution identifying the variance of errors and use the variance to determine the expected variance about a the forecast of network traffic.

15. A computer implemented method comprising:
for each of a plurality of multiple different network traffic metrics,
generating a forecast of network traffic using a model, the forecast being based on previously observed network traffic;
generating a prediction interval that extends above and below the forecast of the network traffic, the prediction interval being based on previously observed deviations from predicted network traffic;
comparing observed network traffic to the prediction interval;
identifying, by computer, an outlier for the metric if the observed network traffic is outside of the prediction interval during a time period;
computing a count of outliers for the metric that are identified during the time period; and
identifying an anomaly for the metric in network traffic only when the computed count of outliers for the metric identified during the time period is greater than or equal to two and the computed count of outliers identified for the metric during the time period exceeds an anomaly threshold for the metric that is greater than or equal to one; and
merging identified anomalies for each of the multiple different network traffic metrics to identify a single event.

16. The computer implemented method of claim 15, the method further comprising:
generating the forecast using a model that includes at least a first and a second seasonality, the forecast being based on previously observed network traffic at first and second time periods associated with the first and the second seasonality.

17. The computer implemented method of claim 16, further comprising generating the forecast using a Holt-Winters model having daily and weekly seasonality.

18. The computer implemented method of claim 17, further comprising
initializing the model used to generate the forecast based on at least two weeks of network traffic data; and
initializing errors used to generate the prediction interval using at least one week of network traffic data.

19. The computer implemented method of claim 17, further comprising defining a distribution identifying the variance of errors and use the variance to determine the expected variance about the forecast of network traffic.

* * * * *